(12) United States Patent
Xiao et al.

(10) Patent No.: US 9,553,803 B2
(45) Date of Patent: Jan. 24, 2017

(54) PERIODICAL GENERATION OF NETWORK MEASUREMENT DATA

(71) Applicant: Nicira, Inc., Palo Alto, CA (US)

(72) Inventors: Jun Xiao, Beijing (CN); Romain F. Lenglet, Mountain View, CA (US)

(73) Assignee: NICIRA, INC., Palo Alto, CA (US)

( * ) Notice: Subject to any disclaimer, the term of this patent is extended or adjusted under 35 U.S.C. 154(b) by 128 days.

(21) Appl. No.: 14/320,090

(22) Filed: Jun. 30, 2014

(65) Prior Publication Data

US 2015/0381486 A1 Dec. 31, 2015

(51) Int. Cl.
| | |
|---|---|
| *H04J 1/16* | (2006.01) |
| *H04L 12/721* | (2013.01) |
| *H04L 12/24* | (2006.01) |
| *H04L 12/26* | (2006.01) |
| H04L 12/803 | (2013.01) |
| H04L 12/751 | (2013.01) |

(52) U.S. Cl.
CPC ........... *H04L 45/70* (2013.01); *H04L 41/0896* (2013.01); *H04L 43/0894* (2013.01); *H04L 43/12* (2013.01); *H04L 45/02* (2013.01); *H04L 47/125* (2013.01)

(58) Field of Classification Search
CPC .. H04L 41/0896; H04L 43/12; H04L 43/0894; H04L 45/70; H04L 47/125
See application file for complete search history.

(56) References Cited

U.S. PATENT DOCUMENTS

| | | |
|---|---|---|
| 5,224,100 A | 6/1993 | Lee et al. |
| 5,245,609 A | 9/1993 | Ofek et al. |
| 5,265,092 A | 11/1993 | Soloway et al. |
| 5,781,534 A | 7/1998 | Perlman et al. |
| 6,104,700 A | 8/2000 | Haddock et al. |
| 6,430,160 B1 | 8/2002 | Smith et al. |

(Continued)

FOREIGN PATENT DOCUMENTS

| | | |
|---|---|---|
| JP | 2002-141905 | 5/2002 |
| WO | WO 95/06989 | 3/1995 |
| WO | WO 2013/184846 | 12/2013 |

OTHER PUBLICATIONS

Non-published commonly owned U.S. Appl. No. 14/320,052, filed Jun. 30, 2014, Xiao, Jun, et al.

(Continued)

*Primary Examiner* — Kan Yuen
(74) *Attorney, Agent, or Firm* — Adeli LLP

(57) ABSTRACT

Some embodiments provide a method that generates different network measurements data (e.g., network topology, bandwidth estimation of different paths, etc.) for a pair of endpoints upon receiving a network administrative request (e.g., an application programming interface (API) request) or by other means (e.g., automatically and without intervention of a user). In some embodiments, the method is implemented by a network measurement agent operating on each endpoint and a centralized service component (e.g., web service layer) executing on a network manager machine (e.g., a controller) that responds to measurement requests. The network measurement agent probes the network periodically (i.e., in certain time intervals) or upon an API request that it receives through the network manager machine to gather the measurement data of a particular network topology between a pair of endpoints.

19 Claims, 15 Drawing Sheets

(56) References Cited

U.S. PATENT DOCUMENTS

| | | | |
|---|---|---|---|
| 6,721,334 B1 | 4/2004 | Ketcham | |
| 7,079,544 B2 | 7/2006 | Wakayama et al. | |
| 7,623,461 B2 | 11/2009 | Vasseur et al. | |
| 7,627,692 B2 | 12/2009 | Pessi | |
| 7,706,266 B2 | 4/2010 | Plamondon | |
| 7,760,735 B1 | 7/2010 | Chen et al. | |
| 7,808,919 B2 | 10/2010 | Nadeau et al. | |
| 7,937,492 B1 | 5/2011 | Kompella et al. | |
| 8,160,063 B2 | 4/2012 | Maltz et al. | |
| 8,315,231 B2 | 11/2012 | Pirzada et al. | |
| 8,345,558 B2 | 1/2013 | Nicholson et al. | |
| 8,351,418 B2 | 1/2013 | Zhao et al. | |
| 8,611,351 B2 | 12/2013 | Gooch et al. | |
| 8,630,297 B2 | 1/2014 | Subramanian et al. | |
| 8,634,308 B2 | 1/2014 | Vobbilisetty et al. | |
| 8,670,326 B1 | 3/2014 | Balasubramanian et al. | |
| 8,743,768 B2 | 6/2014 | Vasseur et al. | |
| 8,787,400 B1 | 7/2014 | Barth et al. | |
| 2002/0018447 A1 | 2/2002 | Yamada et al. | |
| 2003/0103510 A1* | 6/2003 | Svanberg | H04L 12/4633 370/395.2 |
| 2004/0010617 A1 | 1/2004 | Akahane et al. | |
| 2004/0170124 A1* | 9/2004 | De Clercq | H04L 12/5695 370/229 |
| 2004/0184483 A1* | 9/2004 | Okamura | H04L 47/10 370/477 |
| 2005/0132044 A1 | 6/2005 | Guingo et al. | |
| 2005/0232230 A1 | 10/2005 | Nagami et al. | |
| 2006/0028999 A1 | 2/2006 | Iakobashvilli et al. | |
| 2006/0029056 A1 | 2/2006 | Perera et al. | |
| 2006/0037075 A1 | 2/2006 | Frattura et al. | |
| 2006/0206655 A1 | 9/2006 | Chappell et al. | |
| 2006/0282895 A1 | 12/2006 | Rentzis et al. | |
| 2007/0055789 A1 | 3/2007 | Claise et al. | |
| 2008/0049614 A1 | 2/2008 | Briscoe et al. | |
| 2008/0049786 A1 | 2/2008 | Ram et al. | |
| 2008/0144511 A1* | 6/2008 | Marcondes | H04L 45/00 370/236 |
| 2009/0010254 A1 | 1/2009 | Shimada | |
| 2010/0128623 A1 | 5/2010 | Dunn et al. | |
| 2011/0093612 A1* | 4/2011 | Murakami | H04L 63/1408 709/238 |
| 2011/0317696 A1 | 12/2011 | Aldrin et al. | |
| 2012/0159454 A1 | 6/2012 | Barham et al. | |
| 2012/0287791 A1 | 11/2012 | Xi et al. | |
| 2013/0067067 A1 | 3/2013 | Miri et al. | |
| 2013/0332602 A1 | 12/2013 | Nakil et al. | |
| 2014/0029451 A1 | 1/2014 | Nguyen | |
| 2014/0119203 A1 | 5/2014 | Sundaram et al. | |
| 2014/0195666 A1 | 7/2014 | Dumitriu et al. | |
| 2014/0281030 A1 | 9/2014 | Cui et al. | |
| 2015/0163144 A1 | 6/2015 | Koponen et al. | |
| 2015/0163145 A1* | 6/2015 | Pettit | H04L 47/125 370/237 |

OTHER PUBLICATIONS

Non-published commonly owned U.S. Appl. No. 14/341,626, filed Jul. 25, 2014, Xiao, Jun, et al.

Phaal, Peter, et al., "sFlow Version 5," Jul. 2004, pp. 1-46, sFlow. org.

Phan, Doantam, et al., "Visual Analysis of Network Flow Data with Timelines and Event Plots," Month Unknown, 2007, pp. 1-16, VizSEC.

Abujoda, Ahmed, "Network Measurement in Virtualized Networks and its Challenges," 6th GI/ITG KuVS Workshop on Future Internet, Nov. 22, 2010, pp. 1-22, Institut für Kommunikations-Technik, Leibniz Universität Hannover, Germany.

Augustin, Brice, et al., "Avoiding traceroute anomalies with Paris traceroute," IMC '06, Oct. 25-27, 2006, 6 pages, ACM, Rio de Janeiro, Brazil.

Prasad, Ravi, et al., "Bandwidth Estimation: Metrics, Measurement Techniques, and Tools," vol. 17, Issue 6, Nov./Dec. 2003, pp. 27-35, IEEE Network.

\* cited by examiner

PERIODICAL GENERATION OF NETWORK MEASUREMENT DATA

BACKGROUND

Network fabric's measurement tools have been widely explored over the past several years. The most important characteristics of a network fabric are network topology, bandwidth, and latency. Measurement of such characteristics of a network is important for network troubleshooting and optimization of network applications such as end-to-end transport performance, intelligent overlay network routing, and peer-to-peer file distribution.

There are quite a few tools that are currently used to estimate bandwidths of hop-by-hop links or end-to-end paths in a network. However, with recent evolution in network technology, network topologies have become more and more complex. For example, in recent years, Equal-Cost Multi-Path (ECMP) Internet Protocol (IP) routing has been widely deployed to implement load balancing in the networks. The ECMP routing potentially offers substantial increases in bandwidth of the network by load-balancing the network traffic over multiple paths. For such networks, the current measurement tools can only estimate the bandwidth for a single random path.

There are also multiple paths discovery tools that are currently used to detect multiple paths between a given Internet Protocol (IP) endpoints pair in networks that deploy load balancing forwarding elements (e.g., load balancing routers). These tools, however, have their own shortcomings. For example, most available network path discovery tools (e.g., traceroute) can only discover a limited number of paths (e.g., three paths) in best-case scenario. Additionally, there is always the possibility that these tools fail to discover true nodes and links in a network or worse yet, introduce false links that in reality don't exist in the network.

For data center networks, the aforementioned network characteristics are rarely explored and those network fabrics are mostly treated as high-capacity black boxes. However, with the evolution of Software-Defined Data Centers (SDDC), more and more aspects of the infrastructure of the network are abstracted and built on top of the network fabric, and understanding network fabric characteristics has become crucial for planning, monitoring, and troubleshooting of the networks.

SUMMARY

Some embodiments of the invention provide a novel method for measuring network characteristics (e.g., bandwidth, path diversity, etc.) without requiring administrative access to intermediate network elements and independent from the specific network fabric. In some embodiments, the method uses a multi-path estimation technique that takes into account all the different paths between a given pair of endpoints. The method of some embodiments measures the bandwidth (e.g., available bandwidth, capacity, etc.) between a given pair of endpoints (e.g., a source forwarding element and a destination forwarding element at the edges of the network) by identifying the routing paths between the endpoints and calculating the bandwidth for each path in order to estimate the network bandwidth between the endpoints.

The method of some embodiments identifies a network topology that is involved in routing of the network traffic between the endpoints. The identified topology covers (1) all the routing paths (e.g., hardware and software-defined paths) between the endpoints and (2) all the forwarding elements (e.g., hardware and software-defined non-edge forwarding elements) along each path that forwards the network traffic (e.g., network packets). The method identifies, and groups together, the receiving interfaces as well as the forwarding interfaces of each forwarding element along different paths between the endpoints. By doing so, the method can identify a real link between a pair of forwarding elements when a set of forwarding interfaces of each one of the forwarding elements in the pair points to the other forwarding element.

After identifying the network topology, including all of the existing routing paths between a source endpoint and a destination endpoint (e.g., in a software-defined datacenter), and all of the forwarding elements along each routing path, the method of some embodiments chooses a single flow signature for each identified path. The method generates bandwidth estimation probing packets with each flow signature (e.g., having a different transmission control protocol (TCP) or user datagram protocol (UDP) source port) in order to calculate an estimated bandwidth for each link (e.g., hop-by-hop link) of the path corresponding to the flow signature.

The method of some embodiments aggregates all of the calculated estimated bandwidths of the links in order to estimate the bandwidth between the two endpoints. In order to aggregate, the method first normalizes the estimated bandwidths of diverged links. That is, the method of some embodiments calculates a minimum bandwidth between all of the links that share the same starting and ending forwarding elements in order to calculate the bandwidth between the shared starting and ending forwarding elements. The method then calculates a minimum bandwidth between the shared forwarding elements of the diverged links and all other non-diverged links that lie between the endpoints (i.e., the source endpoint and the destination endpoint) in order to estimate the bandwidth between the two endpoints.

In some embodiments, the method generates different network measurements data (e.g., network topology, bandwidth estimation of different paths, etc.) for a pair of endpoints upon receiving a network administrative request (e.g., an application programming interface (API) request) or by other means (e.g., automatically and without intervention of a user). In some embodiments, the method is implemented by a network measurement agent operating on each endpoint and a centralized service component (e.g., web service layer) executing on a network manager machine (e.g., a controller) that responds to measurement requests. The network measurement agent of some embodiments probes the network periodically (i.e., in certain time intervals) or upon an API request that it receives through the network manager machine to gather the measurement data of a particular network topology between a pair of endpoints (e.g., the pair of endpoints on which the network measurement agents operate).

In some embodiments, when a network measurement feature is turned "on" or enabled (e.g., through an API), the network measurement agent can provide (e.g., to a network measurement server or the network manager machine) real-time data (e.g., bandwidth capacity, available bandwidth, etc.) or the most recent measurement data on each possible path (e.g., a link, multiple links, etc.) between a given pair of internet protocol (IP) endpoints.

For instance, with an API request via a network measurement interface, the network measurement agent of some embodiments can periodically measure the bandwidths between a pair of endpoints of the network. This is important because the data (e.g., real-time data) can be used in a number of different ways, including forwarding traffic along different paths. For instance, the always "on" feature can be used to retrieve real-time measurement data and assign different flow signatures or hashes for different data flows depending on the measurement data. With the hop-by-hop measurements and the different flow signatures associated with a given topology, the flow of data, from a source to a destination, can even be controlled on a per hop basis.

The network measurement server of some embodiments stores the provided network measurement data in a storage (e.g., a database). Rather than simply storing the measurement data, the server of some embodiments accumulates or aggregates the measurement data. That is, for a pair of endpoints, the server stores the measurement data and then updates the data with each updated measurement data it receives from the measurement agents. By knowing the estimated bandwidth for different paths, a network controller that controls a forwarding element in the routing path can decide or specify which path to use for packets that are associated with a particular data flow (e.g., elephant flows, mouse flows, etc.). In this manner, one set of packets belonging to a particular data flow (e.g., mouse flow) is not held behind a routing path that is used by another set of packets belonging to another data flow (elephant flow) for a prolonged period of time.

Alternatively, or conjunctively, the network measurement agent of some embodiments provides the network measurement data to a transport node (e.g., edge forwarding element) to facilitate monitoring and optimization of the routing of network data flows by the transport node. For instance, the forwarding element can decide to switch the transportation of a particular data flow from one path to another path based on the capacity and available bandwidth of each path. In some embodiments, a forwarding element (e.g., an edge forwarding element) breaks an elephant flow to multiple mice flows and route each mouse flow to a different routing path based on the capacity and available bandwidth that it receives from its corresponding network measurement agent. The forwarding elements of some embodiments make such decisions through one or more controllers (e.g., hardware or software-defined controllers) that control the forwarding elements.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for measuring network characteristics (e.g., bandwidth, path diversity, etc.) without requiring administrative access to intermediate network elements and independent from the specific network fabric. In some embodiments, the method uses a multi-path estimation technique that takes into account all the different paths between a given pair of endpoints. The method of some embodiments measures the bandwidth (e.g., available bandwidth, capacity, etc.) between a given pair of endpoints (e.g., a source forwarding element and a destination forwarding element at the edges of the network) by identifying the routing paths between the endpoints and calculating the bandwidth for each path in order to estimate the network bandwidth between the endpoints.

In some embodiments, the method estimates the bandwidth between source and destination endpoints. In some embodiments, the source or destination endpoint can be any machine (e.g., virtual machine (VM), computing device). In some embodiments, the endpoint can also be an end node forwarding element. In some embodiments, the end node forwarding elements are edge forwarding elements (EFEs), which are the first forwarding elements to which the source machine and destination machines respectively send and receive the packets.

The edge forwarding elements of some embodiments are software-defined forwarding elements that execute on a host computing device, on which the source and destination VMs execute. For instance, the source machine can be the VM that sends the packets, and the destination machine can be the VM that receives the packets. In some embodiments, the source VM is on one host computing device, on which the source edge forwarding element executes, while the destination VM is on another host computing device, on which the destination edge forwarding element executes.

Figure 1:
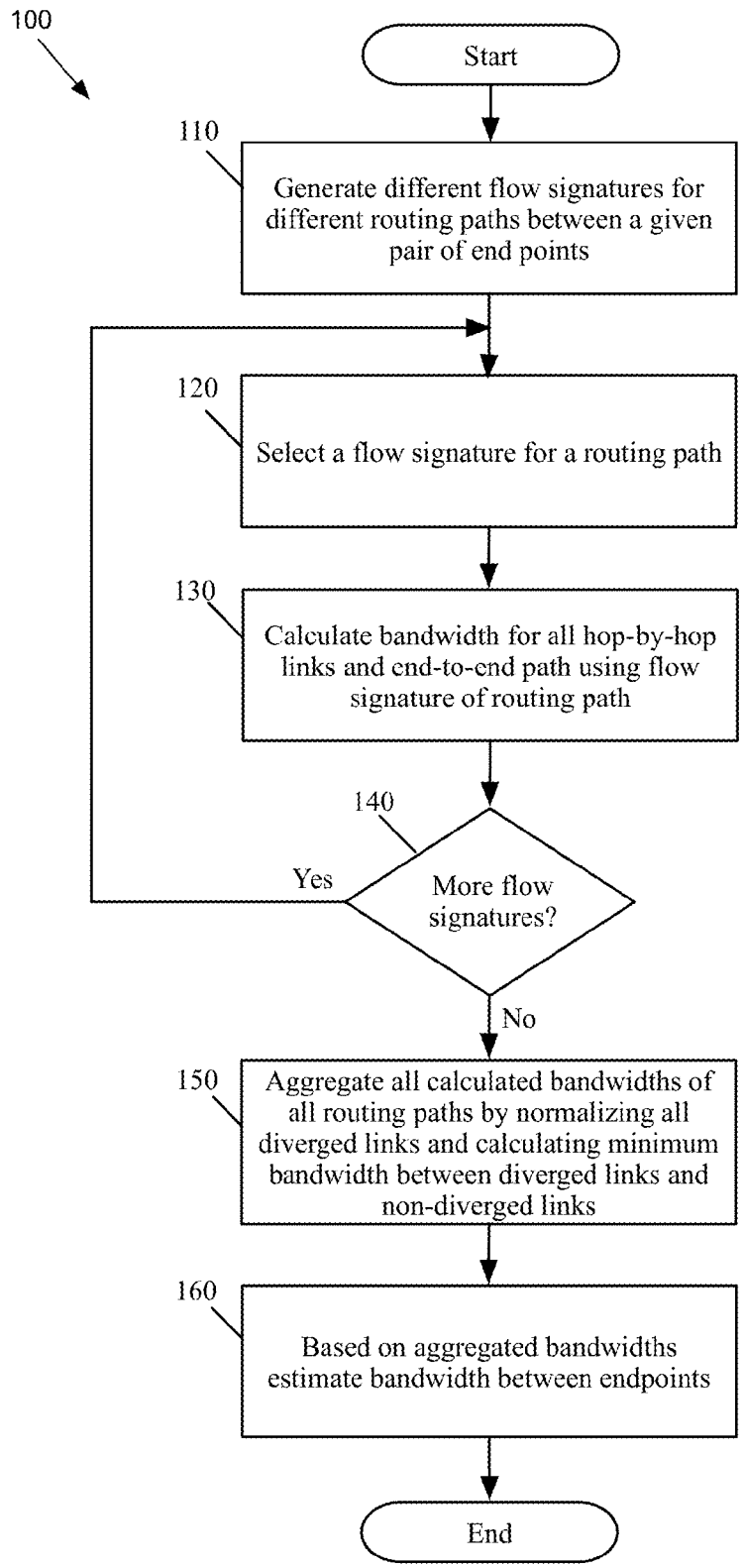
FIG. 1 conceptually illustrates a process that some embodiments use to estimate the bandwidth between two endpoints.

FIG. 1 conceptually illustrates a process 100 that some embodiments use to estimate the bandwidth between two endpoints (e.g., two edge forwarding elements). In some embodiments the process 100 is implemented by a bandwidth measurement agent or tool on each transport node (e.g., source or destination endpoint) to measure and combine network fabric measurements including topologies, network bandwidth estimations.

The process 100 begins by receiving (at 110) a pair of endpoints (e.g., internet protocol (IP) pair of endpoints) and generating different flow signatures for different routing paths between the endpoints. In some embodiments, the process 100 identifies the different paths and all the non-edge forwarding elements (NEFEs) along each identified path using an enhanced traceroute algorithm (e.g., enhanced Paris traceroute algorithm). Identifying the different paths and the NEFEs along the paths is discussed in more detail in Section I below, while assigning flow signatures to each identified path is discussed in more detail in Section II below.

The process 100 then selects (at 120) a first flow signature that it has assigned to a first path between the endpoints. At 130, the process 100 calculates an estimated bandwidth for each link (hop-by-hop link) of the first path. In some embodiments, the process forwards probing packets with the flow signature by a bandwidth estimation tool to the path to calculate the estimated bandwidth of each link on the path. More detail on forwarding probing packets to different paths by the bandwidth estimation tool is discussed in Section II below.

The process 100 then determines (at 140) whether there are more flow signatures assigned to more paths or not. If the process determines that there are more flow signatures, the process 100 returns to 120 to select the next flow signature and calculate the bandwidths of all the links on a path corresponding to the next flow signature. On the other hand, if the process 100 determines (at 140) that there are no more flow signatures left, the process 100 proceeds to 150.

At 150, the process aggregates all calculated bandwidths of all routing paths. The process of some embodiments aggregates the estimated bandwidths by first normalizing all diverged links that share the same starting and ending nodes (i.e., NEFEs) recursively and then calculates the minimum bandwidth between the shared forwarding elements of the diverged links and all other non-diverged links that lie between the endpoints. More detail on aggregating the estimated bandwidth of different links is also discussed in Section II below. The process 100 then estimates (at 160) the bandwidth between the two endpoints based on the aggregated estimated bandwidths. The process 100 then ends.

Some embodiments perform variations on the process 100. The specific operations of the process 100 may not be performed in the exact order shown and described. The specific operations may not be performed in one continuous series of operations, and different specific operations may be performed in different embodiments.

Figure 2:
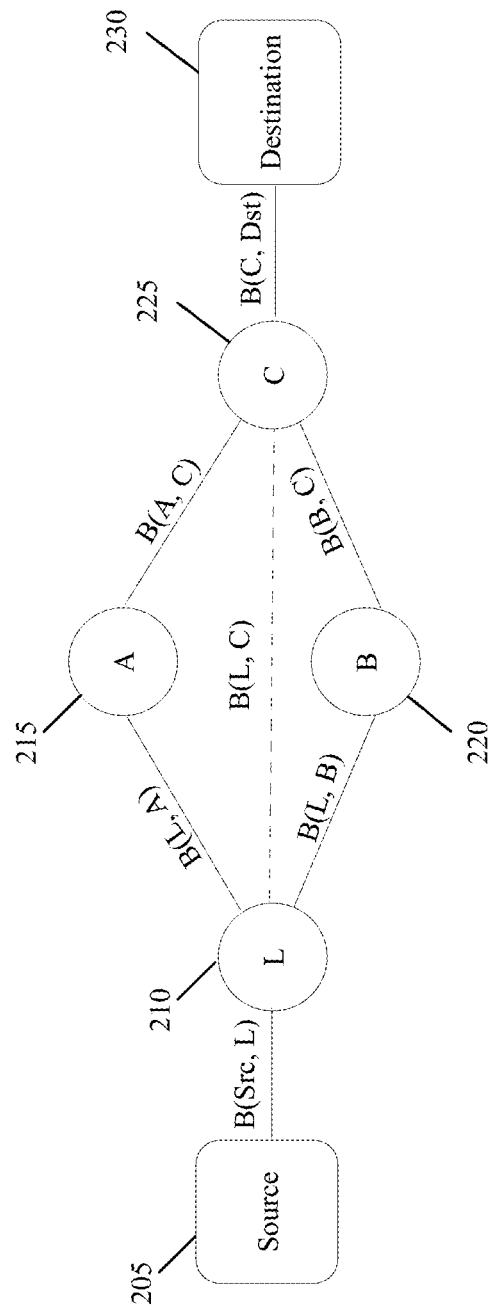
FIG. 2 illustrates an example of how the method of some embodiments estimates the bandwidth between a pair of endpoints.

FIG. 2 illustrates an example of how the method of some embodiments estimates the bandwidth between a pair of endpoints. More specifically, FIG. 2 illustrates a network topology 200 that includes a pair of endpoints 205 and 230 with four forwarding elements 210-225 (e.g., routers, switches) between them. The pair of endpoints in some embodiments includes a source and a destination at the edges of two different hosts.

Each of the forwarding elements (EFEs and NEFEs) in a network (e.g., a datacenter network) of some embodiments can be a physical forwarding element (PFE) or a logical forwarding element (LFE). A physical forwarding element, in some embodiments, can be categorized as a software-defined forwarding element or a hardware forwarding element. A software-defined forwarding element such as Open vSwitch is a software implemented switch that operates on a computing device (e.g., x86 box). A hardware forwarding element, on the other hand, is hardware designed to support in hardware forwarding. For instance, the forwarding element may have application-specific integrated circuits (ASICs) with a Content Addressable Memory (CAM) or Ternary CAM (TCAM). In general each of these PFEs can be a switch, a router, or any other appliance that is capable of receiving and forwarding packets.

Returning to FIG. 2, this figure also shows that the topology estimation method has identified two routing paths between the source endpoint 205 and the destination endpoint 230. The first identified path in the figure includes the nodes Src, L, A, C, and Dst while the second identified path includes the nodes Src, L, B, C, and Dst. The method has sent probing packets with an estimation tool to estimate the bandwidth of all the links on each path. These bandwidth estimations are illustrated as B(Src, L) which is the bandwidth estimation for the link between node 205 and node 210, B(L, A) which is the bandwidth estimation for the link between node 210 and node 215, B(L, B) which is the bandwidth estimation for the link between node 210 and node 220, B(A, C) which is the bandwidth estimation for the link between node 215 and node 225, B(B, C) which is the bandwidth estimation for the link between node 220 and node 225, and finally B(C, Dst) which is the bandwidth estimation for the link between node 225 and node 230.

While the embodiments described above and below provide a method for estimating bandwidth (hop-by-hop links and end-to-end paths) for a pair of endpoints, one of ordinary skill in the art will realize that many embodiments of the invention are equally applicable to estimating latency (hop-by-hop links and end-to-end paths) for a pair of endpoints. In other words, the methodologies and architecture described above and below are used in some embodiments to estimate both bandwidth and latency of the different paths and links between a pair of endpoints.

The method of some embodiments then aggregates the calculated bandwidths by normalizing the diverged links and calculating a minimum of all the bandwidth estimations of the normalized diverged links and all the bandwidth estimations of the non-diverged links to generate the bandwidth estimation between the endpoints 205 and 230. As described above, diverged links are links that share the same starting and ending nodes (diverged nodes). In the illustrated example, the diverged links are links LA and AC on the first path and links LB and BC on the second path. The combination of these links shares the same starting node L as well as the same ending node C.

In order to normalize the diverged links and calculate the bandwidth estimation between the shared nodes of the diverged links, the method of some embodiments first calculates the minimum bandwidth of the diverged links on the first path and adds the result to the minimum bandwidth of the diverged links on the second path. Therefore in FIG. 2 the estimated bandwidth between the diverged nodes L and C (i.e., B(L, C)) will be the minimum bandwidth of the diverged links LA and AC (i.e., MIN(B(L, A), B(A, C))) plus the minimum bandwidth of the diverged links LB and BC (i.e., MIN(B(L, B), B(B, C))).

In order to complete the aggregation, the method of some embodiments after calculating the bandwidth estimation between the diverged nodes, calculates the minimum bandwidth between the diverged nodes that are shared by the diverged links and all other non-diverged links that lie between the endpoints. The result of this calculation will be the bandwidth estimation between the two endpoints 205 and 230.

Having described a brief overview of a bandwidth measurement method between a pair of endpoints, several different aspects of the method now will be described in detail in the following sections. In particular, Section I describes an enhanced traceroute method that provides a network topology between a pair of endpoints. This is followed by Section II that describes how the method of some embodiments estimates the bandwidth between a pair of endpoints using the network topology and flow signatures. Section III then describes a network measurement agent that periodically probes a network. Section IV then describes an electronic system for implementing some embodiments of the invention.

I. Network Topology

The method of some embodiments identifies a network topology that is involved in routing of the network traffic between a pair of endpoints. The network traffic, in some embodiments, includes network packets that belong to different data flows as well as individual network packets. The term "packet" is used here as well as throughout this application to refer to a collection of bits in a particular format sent across a network. One of ordinary skill in the art will recognize that the term "packet" may be used herein to refer to various formatted collections of bits that may be sent across a network, such as Ethernet frames, TCP segments, UDP datagrams, IP packets, etc.

The identified topology covers (1) all the routing paths (e.g., hardware and software-defined paths) between the endpoints and (2) all the forwarding elements (e.g., hardware and software-defined non-edge forwarding elements) along each path that forwards the network traffic (e.g., network packets). The method identifies, and groups together, the receiving interfaces as well as the forwarding interfaces of each identified forwarding element along different paths between the endpoints. By doing so, the method can identify a real link between a pair of forwarding elements when a set of forwarding interfaces of each one of the forwarding elements in the pair points to the other forwarding element.

Traditionally, different traceroute algorithms were used to discover a network topology (i.e. different paths and different forwarding elements along the paths) between two endpoints. However, after introduction of Equal-Cost Multi-Path (ECMP) Internet Protocol (IP) routing mechanism and load balancing in the networks where there is no more a single route from a source to a destination, the traditional traceroute algorithms fail to discover true nodes and links between the nodes. These problems arise because traditional traceroute methods discover hops along a route with a series of probing packets while a load balancing router may direct the probing packets along different paths.

The Paris traceroute algorithm was introduced to solve the multipath discovery shortcomings of classic traceroute algorithms. However, Paris traceroute only returns forwarding elements' receiving interfaces and therefore can generate false measurements in ECMP fabrics with routers configured with numbered interfaces, as internet control message protocol (ICMP) reply messages can be returned on asymmetric paths which results in the prober deducing incorrect interfaces at which probe packets have arrived. Moreover, Paris traceroute only discover interfaces and lacks the representation for routers with multiple interfaces in the network topology.

Unlike traditional traceroute algorithms or Paris traceroute, some embodiments provide a novel method that discovers both forwarding interfaces and receiving interfaces of the forwarding elements of a multi-path network and groups the discovered interfaces together to (1) identify each physical forwarding element (e.g., software-defined or hardware forwarding element) separately and (2) identify which forwarding elements point to each other to draw a link between them. In order to do so, the method of some embodiments uses the "record route" option in the probing packets' headers to accurately identify the forwarding elements and the links between them. More specifically, the initiator of the probing packet, upon receiving the packet back from a forwarding element with its corresponding ICMP error message, parses the record route option in the inner packet header and the tip entry in the header will be the forwarding interface of the forwarding element that has returned the packet with the error message.

Figure 3:
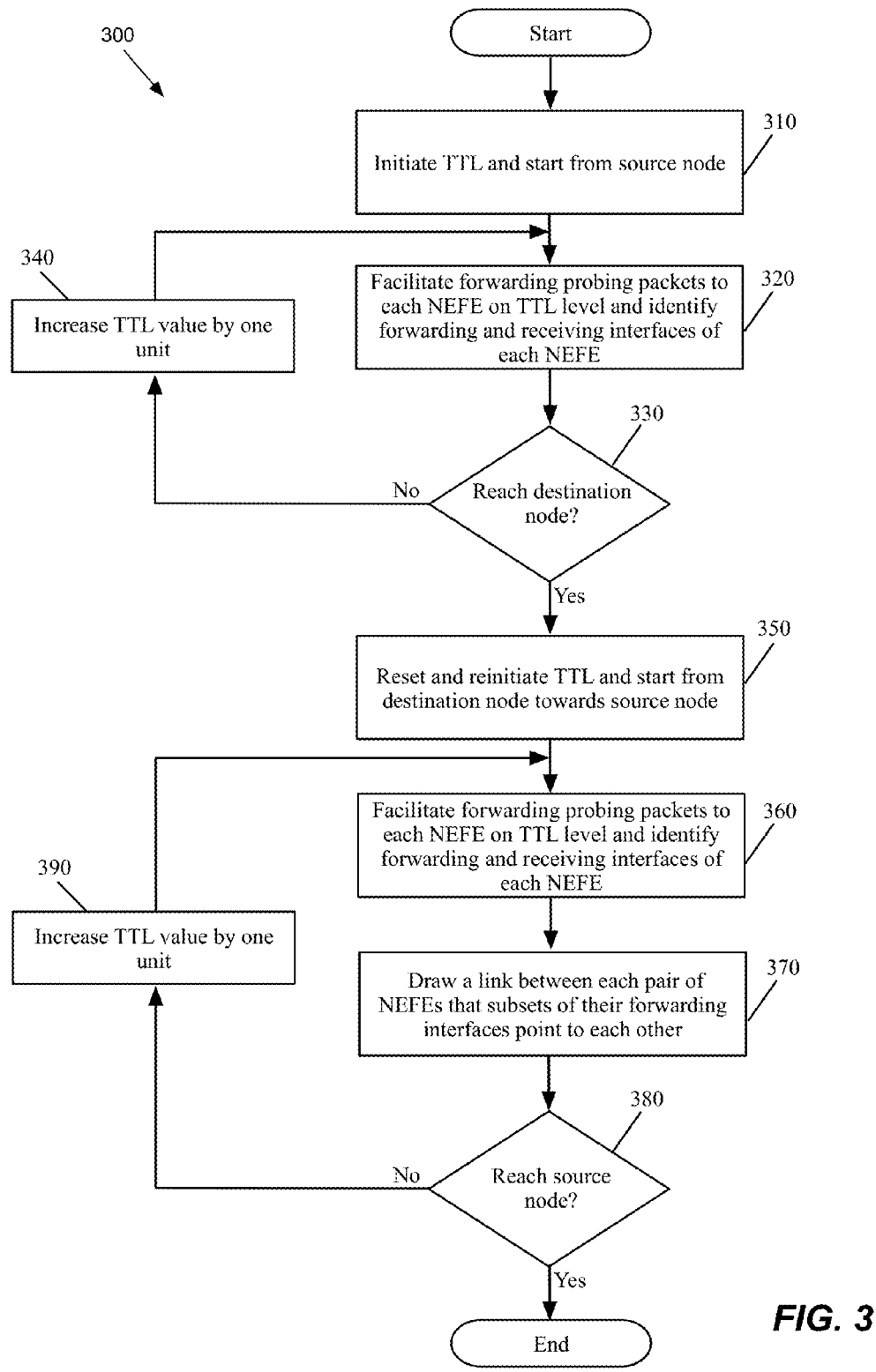
FIG. 3 conceptually illustrates a process of some embodiments that identifies a network topology between two endpoints.

FIG. 3 conceptually illustrates a process 300 of some embodiments that identifies a network topology between two endpoints (e.g., two transport nodes). In some embodiments, the process 300 is initiated using API calls from a network measurement server via the network measurement interface to the network measurement agents that operate on each transport node (e.g., source and destination nodes). FIG. 3 will be described by reference to FIG. 4 which illustrates an example of how the process 300 identifies the network topology in some embodiments.

The process 300 begins by initiating (at 310) the time to live (TTL) value in the probing packet's header and routing the probing packet from the source node to the next forwarding element. The TTL is a value in a packet's header that tells a forwarding element whether or not the packet has been in the network for too long and if it has, the packet should be discarded. For a number of reasons, packets may not get delivered to their destination in a reasonable length of time. For example, a combination of incorrect routing tables could cause a packet to loop endlessly. A solution is to discard the packet after a certain time and send a message to the originator, which can decide whether to resend the packet or drop it.

Each time the packet is received by a forwarding element, the forwarding element decreases one unit from the TTL value and when the packet's TTL value reaches zero, it will be discarded and returned to the originator of the packet by the forwarding element with an error message. For instance when a TTL value is set to 3 and the packet reaches the third forwarding element on its route, the TTL value is decremented to zero which indicates to the forwarding element that the packet has been forwarded in the network for too long and subsequently the forwarding element returns the packet with an error message (e.g., ICMP error message) to its originator (e.g., the source node).

The process 300 then forwards (at 320) the probing packets to each node (i.e., each NEFE) on TTL level and identifies all forwarding and receiving interfaces of each individual node on that TTL level. Such forwarding of probing packets and identification of interfaces of the intermediate nodes are described in more detail below by reference to FIG. 4.

Figure 4:
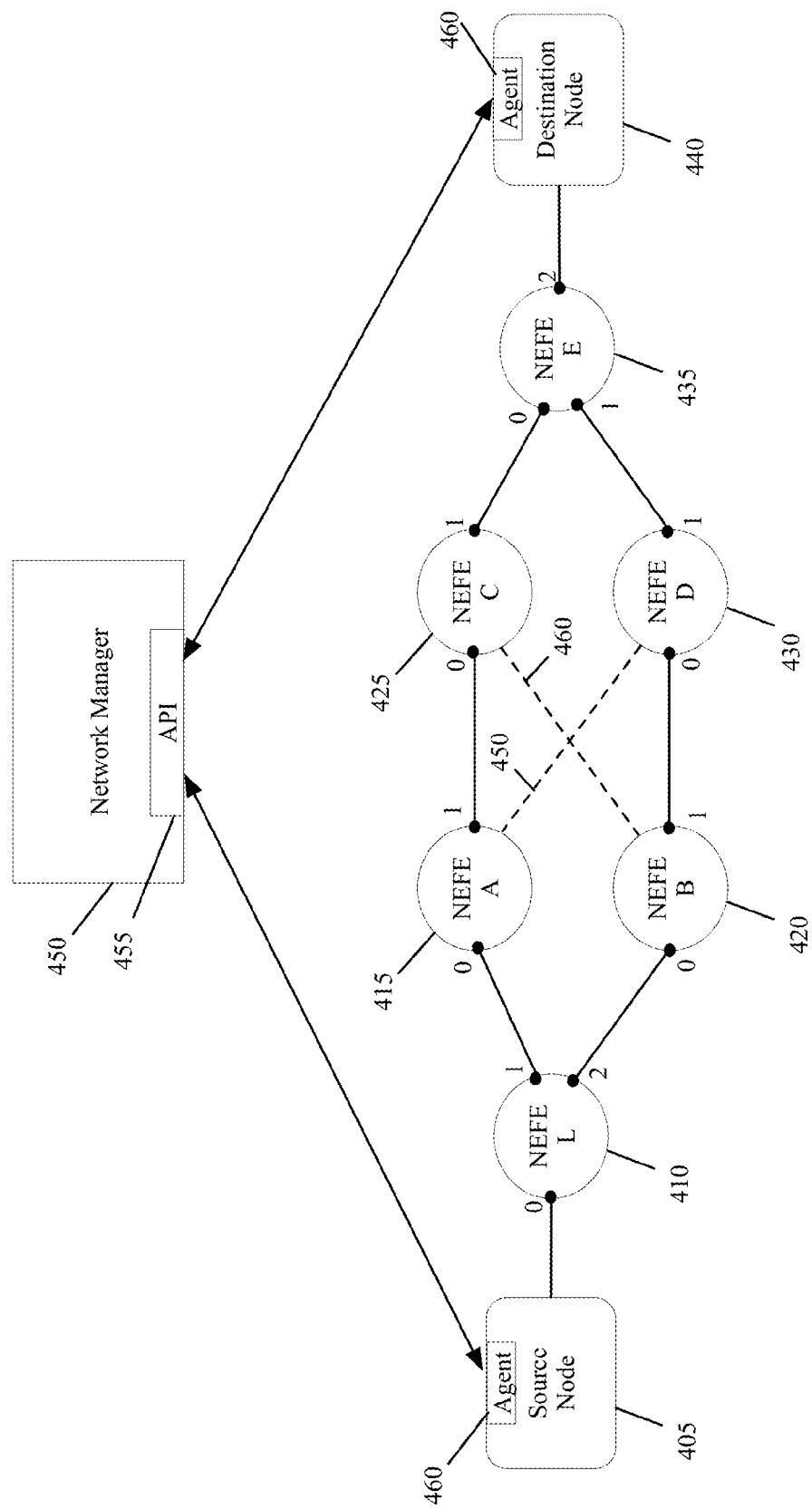
FIG. 4 illustrates an example of how the process of some embodiments identifies the network topology in some embodiments.

FIG. 4 shows a source node 405 and a destination node 440 and several NEFEs 410-435 along two different paths between the pair of nodes (i.e. pair of endpoints). This figure also shows the network manager 450 which in some embodiments is used to manage and configure the transport nodes 405 and 410. The network manager 450 of some embodiments includes application programming interfaces (APIs) 455 to communicate with the network measurement agents 460 that execute on the transport nodes 405 and 410. The network measurement agents of some embodiments execute on transport nodes at the edge of the network including a hypervisor of a host that includes several virtual machines. The network management server provides a centralized service component (e.g., web service layer) that serves the network measurement requests.

Through the measurement interface 455, the network manager 450 interacts with network measurement agents on different transport nodes at the edge of the network for collecting, aggregating, and combining network measurements (e.g., bandwidth, latency, topology, etc.) and making those measurements available to other network elements and/or services. Also, the network manager 450 may perform additional management services by sending (e.g., pushing) management data (e.g., bridge information, virtual interface information, tunnel information, etc.) to the physical forwarding elements (e.g., transport nodes). The network manager of some embodiments performs the configuration by sending (e.g., pushing) data flows to the transport nodes. Instead of sending flows, the network manager 450 of some embodiments exchanges forwarding state information that is translated into a set of data flows at the transport nodes. Several examples of such additional services will be discussed in more detail below in Section III by reference to FIG. 12.

In the example of FIG. 4, the measurement interface 455 is shown as being implemented on the same computing device as the network manager 450. However, the measurement interface can be implemented on any machine, virtual or dedicated. As an example, the measurement interface can be implemented on a hypervisor, a service virtual machine (VM), a separate measurement aggregating machine, etc. The measurement interface can also be implemented, in some embodiments, on a same device or hypervisor as a software or virtual forwarding element (e.g., the transport nodes 405 and 410). The measurement interface can be an application or a plug-in component that runs on a particular operating system.

In order to recognize the network topology between the pair of endpoints, the source node 405 forwards the first probing packet (or first set of probing packets) to the next forwarding element 410 (i.e., node L) with a TTL value set to 1. Node L receives the probing packet and inserts the forwarding interface "1" in the probing packet's IP record route header, Node L then decreases the TTL value by one, and this reduction in turn tells node 410 that the packet has been in routing for too long since the TTL value will be set to zero. Subsequently, node L generates a Time-to-live exceeded ICMP message which copies the probing packet IP header (also including record route header) and the first 8 bytes of the probing packet's IP payload as ICMP message payload, then sends back to the source EFE 405 via the receiving interface "0".

One of ordinary skill in the art would realize that the number of interfaces associated with each forwarding element in reality can be many more than one or two interfaces that are shown in the figure and the only one or two interfaces illustrated in the example figure are for simplicity of description. Also, one of ordinary skill in the art would realize that the actual addresses for the interfaces are not simple digits (i.e., "0," "1," "2," etc.) and these digits are used only as exemplary figures.

After receiving the probing packet back, as discussed above, the source node 405 parses the receiving interface "0" and the forwarding interface "1" from their corresponding places in the ICMP message. The process then generates more new probing packets with different flow signatures to discover all other sibling nodes of node L that are on the same TTL level. In the illustrated example there is no neighboring node at the same TTL level as node L is.

Returning to FIG. 3 the process 300 then determines (at 330) whether all nodes on different paths are probed. If the process determines that it has reached the destination node (i.e., transport node 440) the process 300 proceeds to 350 (which will be described below), otherwise the process increases the TTL value by one (at 340) and returns to 320 which was described above.

In FIG. 4, the source node then routes another probing packet (or set of probing packets) with a corresponding TTL value set to 2. This time, the packet will first be received by node L and the TTL value is reduced to 1. The packet then will be forwarded to node A and at that point because the TTL value will be set to zero, node A will return an ICMP Time exceeded message which contains the forwarding interface to the originator source node 405 via the receiving interface. As described before, the process then generates more probing packets with different flow signatures to identify the interfaces (forwarding and receiving interfaces) of all the sibling nodes to node A. In the illustrated example, the process identifies the receiving and forwarding interfaces of node B (which is at the same TTL level as node A is) through generating such additional probing pockets.

The process 300 of FIG. 3 performs 320-330 recursively until all the subsets of receiving and forwarding interfaces of all the nodes along different paths are identified. After the process determines (at 330) that all the intermediate nodes before the destination node are probed and it has reached the destination node, the process 300 resets and reinitiates (at 350) the time to live (TTL) value in the probing packet's header and routes the probing packet from the destination node back to the next forwarding element towards the source node. In other words, the process performs a full mesh probing on all forwarding elements that are between the source node and the destination node in order to identify a full mesh network topology between the two nodes. That is, the process forwards new sets of probing packets to all intermediate nodes from both ways to each intermediate node in order to identify all subsets of forwarding interfaces of the nodes (e.g., intermediate NEFEs).

The full mesh probing of some embodiments discovers different subsets of interfaces of the forwarding elements. These subsets of interfaces are then used to (1) aggregate each forwarding element's interfaces when two subsets have intersection (i.e., common elements between the two subsets) and (2) assert a real link between two forwarding elements when their forwarding interfaces point to each other (i.e., when the forwarding interfaces of the first forwarding element point to the second forwarding element and the forwarding interfaces of the second forwarding element point to the first forwarding element).

Similar to identifying subsets of interfaces of each node at a particular TTL level from the source node to the destination node, the process 300 forwards (at 360) new probing packets to all sibling nodes at each TTL level in order to identify forwarding and receiving interfaces of each node at that TTL level. However, this time, because the process has already discovered a subset of forwarding interfaces of the nodes that are placed on the next TTL level, the process can recognize which two intermediate nodes' forwarding elements are pointing to each other.

Therefore, the process 300 draws (at 370) a link between each pair of nodes that are at neighboring TTL levels and that a subset of each node's forwarding interfaces point to the other node. The process then determines (at 380) whether all nodes on different paths are probed. If the process determines that it has reached the source node (i.e., transport node 405) the process 300 ends, otherwise the process increases the TTL value by one (at 390) and returns to 360 which was described above.

In the illustrated example of FIG. 4, the process starts from the destination node forwards probing packets to node E. After identifying that a subset of forwarding interfaces of node E at TTL level one is pointing to node C at TTL level two, while a subset of forwarding interfaces of node C is pointing to node E, the process draws a link between these two nodes. Similarly, after identifying that a subset of forwarding interfaces of node E at TTL level one is pointing to node D at TTL level two, while a subset of forwarding interfaces of node D is pointing to node E, the process draws a link between these two nodes too. However, and unlike other traceroute algorithms, the process will not draw a link 450 between node A and node D because the forwarding interfaces of these two nodes are not pointing to each other. Nor dose the process draw a link 460 between node C and node B, since none of the forwarding elements of any of these two nodes points to the other node.

Some embodiments perform variations on the process 300. The specific operations of the process 300 may not be performed in the exact order shown and described. For instance, the process of some embodiments does not send different probing packets to identify all sibling nodes at a particular TTL level before moving on to the next TTL level. Instead, in some embodiments, the process first discovers all the intermediate nodes along a particular path between the pair of endpoints by forwarding the probing packets to the same path first and after all the nodes on the path are discovered the process starts discovering other paths between the endpoints. Also, the specific operations of the process may not be performed in one continuous series of operations, and different specific operations may be performed in different embodiments.

II. Bandwidth Estimation

After identifying the network topology that includes all of the existing routing paths between a pair of endpoints (e.g., a source endpoint and a destination endpoint in a software-defined datacenter) and all of the forwarding elements along each routing path, the method of some embodiments chooses a single flow signature for each identified path. The method generates bandwidth estimation probing packets with each flow signature (e.g., having a different transmission control protocol (TCP) or user datagram protocol (UDP) source port) in order to calculate an estimated bandwidth for each link (e.g., hop-by-hop link) of the path corresponding to the flow signature. Some embodiments employ the enhanced traceroute algorithm that was described above in Section I to identify the flow signatures between the pair of endpoints. A more detailed example for identifying different flow signatures is described below later in the section. The bandwidth estimation probing packets in some embodiments are generated by different bandwidth estimation tools such as pathchar, clink, pchar, etc.

The method of some embodiments aggregates all of the calculated estimated bandwidths of the links in order to estimate the bandwidth between the two endpoints. To do so, the method normalizes the estimated bandwidths of the diverged links (i.e., links that share the same starting node and the same ending node). That is, the method of some embodiments first identifies each pair of nodes (i.e., diverged nodes) that shares two or more sets of diverged links. Each set of diverged links includes two or more successive links on a particular path that connect the pair of diverged nodes. The method then recursively calculates an estimated bandwidth for a hypothetical link between each pair of diverged nodes. The estimated bandwidth for each hypothetical link is calculated by (1) identifying a minimum of all estimated bandwidths of all diverged links in each set of diverged links on a particular path and (2) summing up the identified minimum bandwidths. After calculating the bandwidths for all hypothetical links between the diverged nodes, the method of some embodiments calculates a minimum of estimated bandwidths of all the hypothetical links and estimated bandwidths of all other non-diverged links that lie between the endpoints (i.e., the source endpoint and the destination endpoint) in order to estimate the bandwidth between the two endpoints.

Figure 5A:
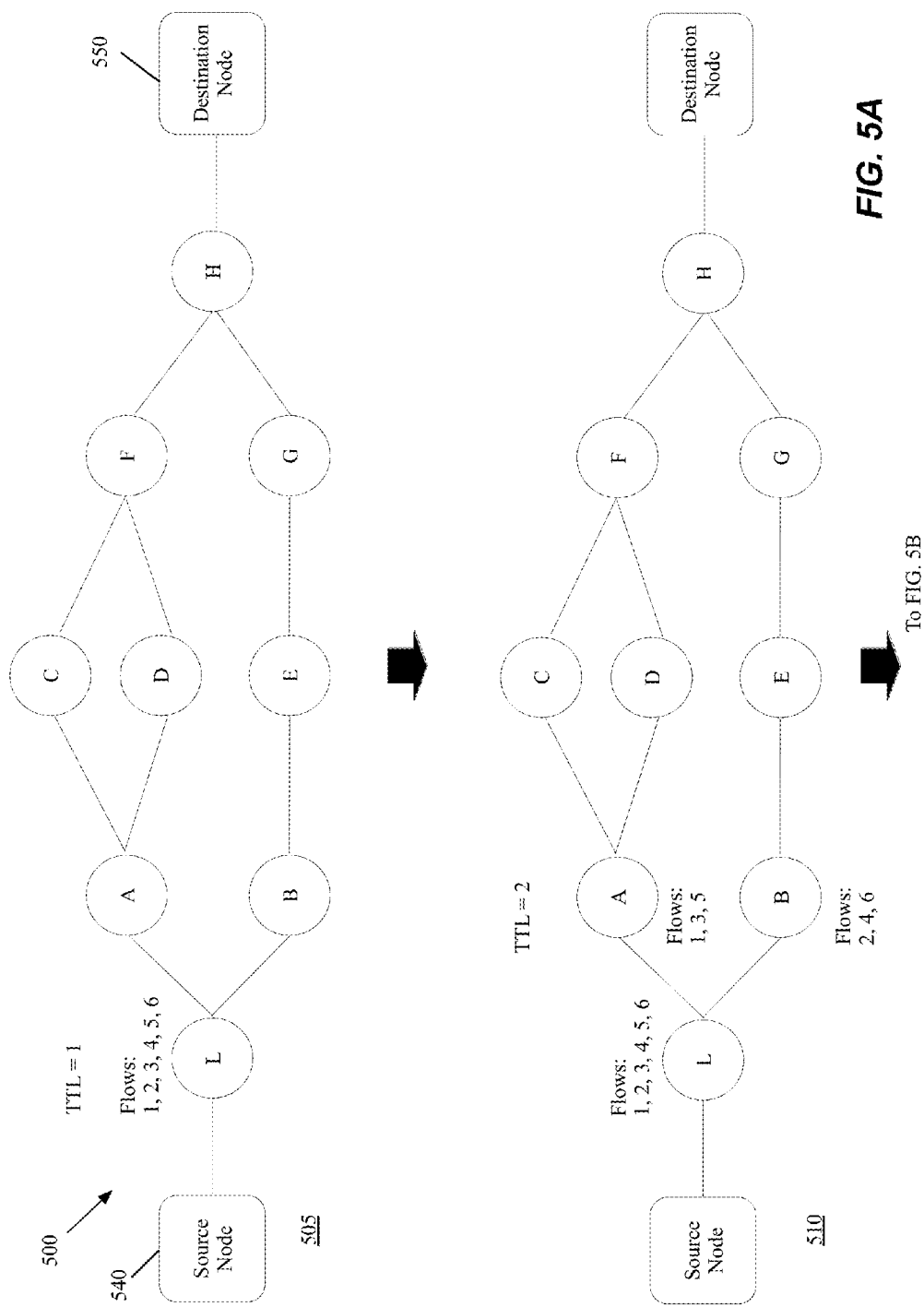
FIG. 5A-5C illustrate an example of how the method of some embodiments identifies different flow signatures for different paths between a pair of endpoints.
Figure 5B:
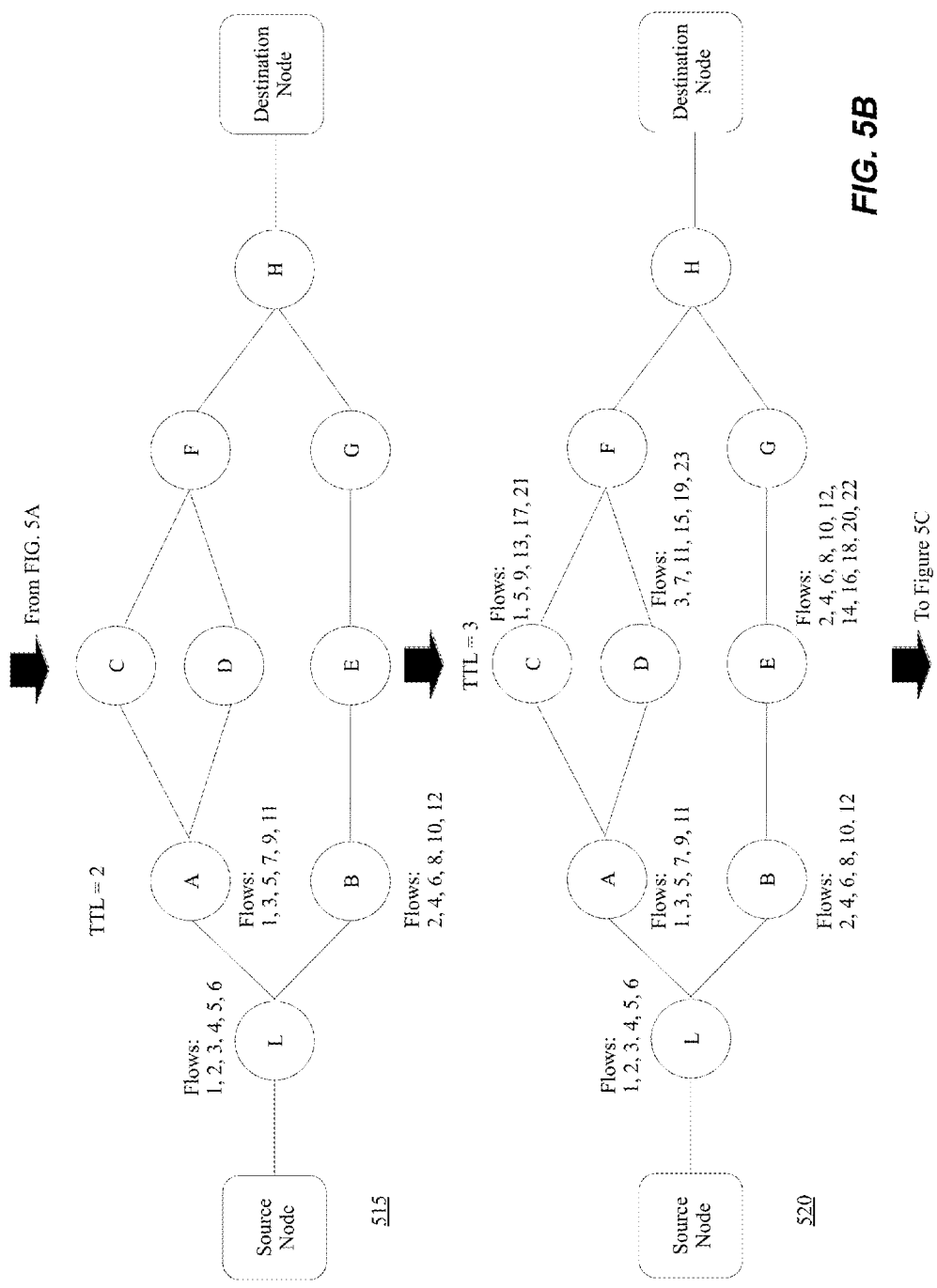
Figure 5C:
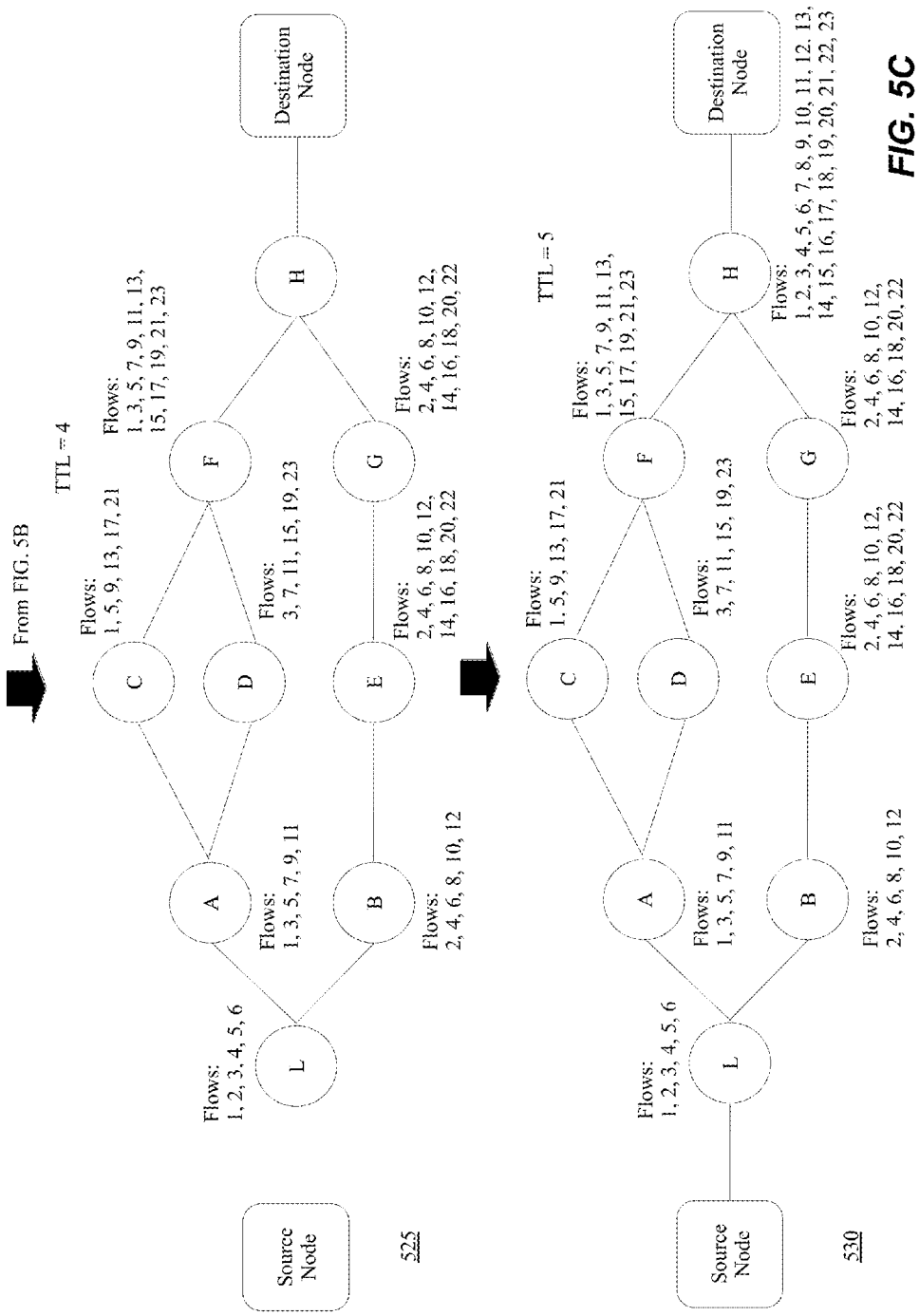

FIGS. 5A-5C illustrate an example of how the method of some embodiments identifies different flow signatures for different paths between a pair of endpoints. More specifically, FIGS. 5A-5C illustrate, through six different stages 505-530 of a network topology 500, how the method of some embodiments identifies the different paths between a pair of endpoints (1) using different flow ids representing different probing packets that are routed through different paths and (2) choosing a single flow signature for each identified path among all the flow ids representing different probing packets that are routed through that path.

The first stage 505 of FIG. 5A illustrates a network topology 500 with a source node (e.g., source EFE) 540 and a destination node (e.g., destination EFE) 550. Between the nodes 540 and 550, there are several other intermediate nodes (e.g., NEFEs) L and A-H. The first stage 505 also shows that six different flow ids 1-6 representing six different probing packets that are forwarded through node L at TTL level one (i.e., TTL value set to one) are assigned to node L. In some embodiments each forwarding element needs to initially have six flow ids to proceed to discover its next hops (i.e., the forwarding elements at the next TTL level, to which the forwarding element can forward packets).

The second stage 510 illustrates that at TTL level two, the method discovers three of the flow ids (i.e., flow ids 1, 3, and 5) on node A, while the other three flow ids (i.e., flow ids 2, 4, and 6) are forwarded to node B (assuming that the flows are evenly load balanced). The third stage 515 in FIG. 5B shows that three more flow ids, namely, flow ids 7, 9, and 11 representing three more probing packets that are generated and forwarded through node A, are assigned to this node in addition to the first three flow ids that were initially discovered on node A. As described above, in some embodiments, when there can be more than one next hop associated with a particular node, the method of some embodiments ensures that there are enough packets that can be forwarded through the particular node (e.g., at least six different flow signatures in the illustrated example should be forwarded through node A). Here, two paths AC and AD are associated with node A while there was initially only three flow ids were discovered in node A. Therefore, the method has generated more packets until there are three more new flow ids discovered on node A (i.e., flow ids 7, 9, and 11). Assuming that node L evenly balances the flows to node A and node B, the method also discovers three more flow ids (i.e., flow ids 8, 10, and 12) on node B that is associated with the same TTL level with which node A is associated.

As it can be noticed in the illustrated example, the newly added flow ids to nodes A and B are not shown to be discovered on node L (i.e., are not added to the previously shown flow ids for this node) even though the packets that they are representing have been forwarded through node L. This is only for simplifying the description of the figure. Also, one of ordinary skill in the art would realize that the illustrated flow ids are for exemplary purposes and each node in reality can be assigned more or less number of flow ids. For instance, after flow ids 1, 3, and 5, were initially discovered on node A in this example, six more flow ids are generated (i.e., flow ids 7-12), three of which are added to flow ids of node A and the other three are assigned to node B based on the assumption that node L evenly balanced the flows to node A and node B. In reality, however, it is possible that many more probing packets are generated to fill the gap for node A and the flow ids in the example are presented only for the simplicity of the explanation.

The fourth stage 520 illustrates that similarly, the method has discovered three flow ids 1, 5, and 9 initially on node C while three flow ids 3, 7, and 11 are discovered on node D. For the same reason that discussed above, this stage also shows the method has generated more probing packets for nodes C and D to make sure they have enough number of flow ids forwarded to them and subsequently assigned additional flow ids 13, 17, and 21 to node C and flow ids 15, 19, and 23 to node D. The fourth stage 520 also shows that node E which is also associated with TTL level 3, has been assigned additional flow ids 14, 16, 18, 20, and 22 on top of the flow ids 2, 4, 6, 8, 10, and 12 that were originally discovered on this node.

The fifth stage 525 in FIG. 5C shows that at the next TTL level (i.e., TTL level 4) all the flow ids that were assigned to nodes C and D in the previous TTL level are combined and assigned to node F which is the receiving node associated with nodes C and D. Similarly, this stage shows that all the flow ids that were assigned to node E are now assigned to node G as well. Since there were enough flow ids to cover the next potential paths associated with the nodes at this TTL level, no more probing packets are generated and therefore no additional flow ids are assigned to any of the nodes at this TTL level.

Finally, the sixth stage 530 illustrates that at the last TTL level 5, all the flow ids that were assigned to nodes F and G at the previous TTL level are now combined and assigned to node H since this node is the receiving node associated with nodes F and G. Therefore, as shown, node H has been assigned all flow ids 1-23. After assigning the flow ids to all the nodes between a pair of endpoints, the method of some embodiments chooses a single flow signature for each path, where the packet generated with that flow signature can be routed from the source node to the destination node through all the intermediate nodes along the path.

Figure 6:
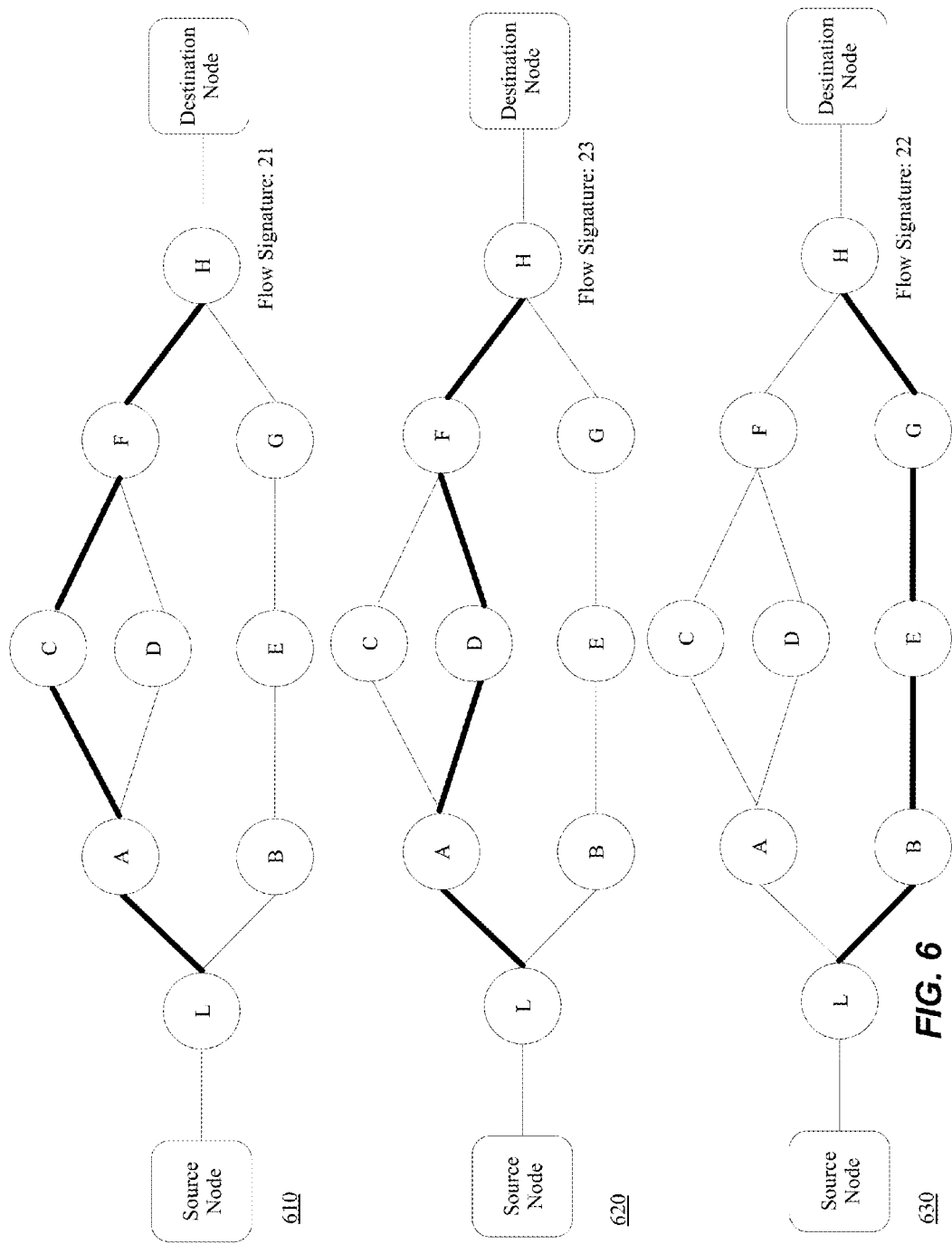
FIG. 6 illustrates an example of choosing a single flow signature for each identified path among all the flow ids assigned to that path.

FIG. 6 illustrates an example of choosing a single flow signature for each identified path among all the flow ids representing different probing packets that are routed through that path. More specifically, this figure shows at stage 610 that the method has chosen flow signature 21 representing one of the probing packets that was routed through the highlighted path L-A-C-F-H from the source node to the destination node.

The next stage 620 shows that the method has chosen flow signature 23 that represents one of the probing packets that is forwarded through the highlighted path L-A-D-F-H from the source node to the destination node. Similarly, at stage 630, the method has chosen flow signature 22 that represents one of the probing packets that is routed through the highlighted path L-B-E-G-H from the source node to the destination node. One of ordinary skill in the art would realize that the illustrated figure and network topology is given as an example and there could be many more intermediate nodes in a network topology that are connected in many other ways. However, the method of assigning flow ids and choosing flow signatures for all other network topologies will be essentially the same as the method that was described above.

Figure 7:
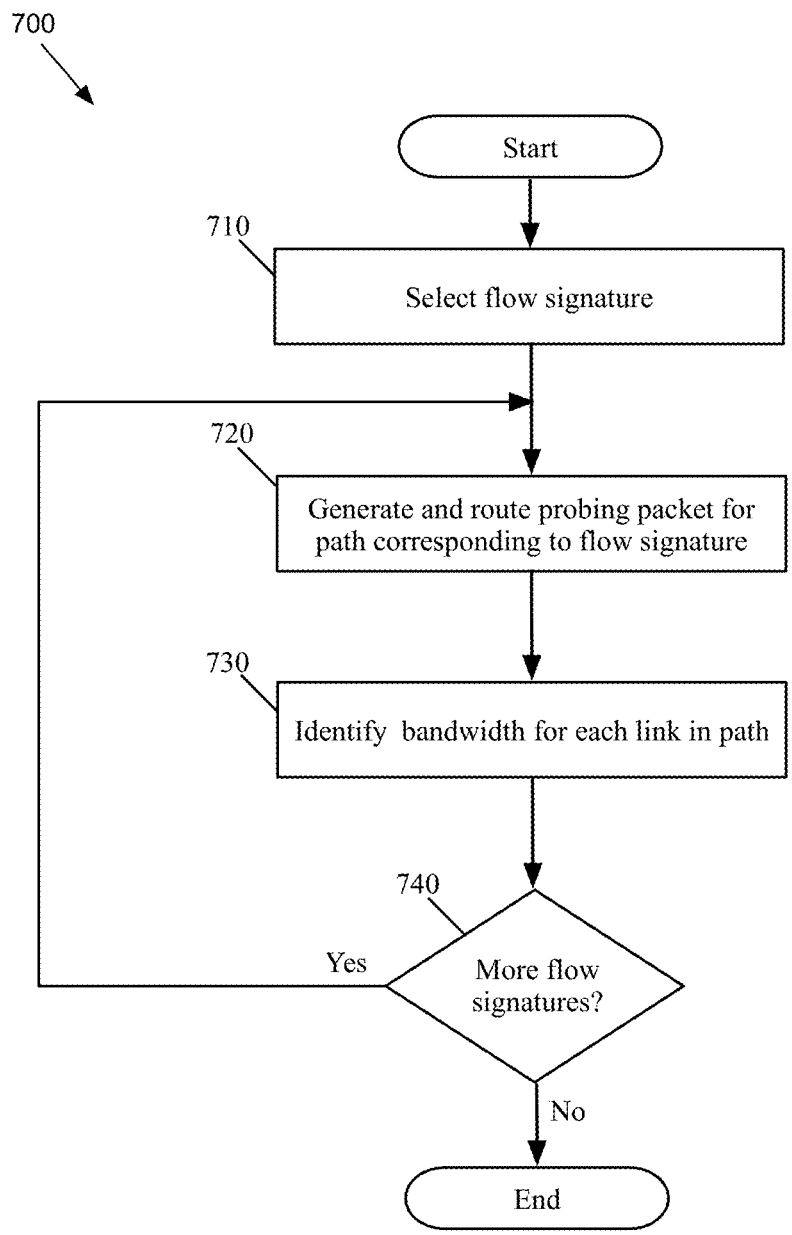
FIG. 7 conceptually illustrates a process of some embodiments that calculates an estimated bandwidth for each link that is along the different routing paths between a pair of endpoints.

FIG. 7 conceptually illustrates a process 700 of some embodiments that calculates a bandwidth estimation for each link (e.g., hop-by-hop link) that is along the different routing paths between a pair of endpoints. In some embodiments the process 700 is implemented by a bandwidth measurement agent or tool on a transport node at the edge of the network (as will be discussed in more detail in Section III below). FIG. 7 will be described by reference to FIG. 8, which illustrates an example of how the process 700 calculates an estimated bandwidth for each link along the different paths.

The process 700 begins by selecting (at 710) the first flow signature that the method has identified for the first routing path between the endpoints. The process 700 then generates (at 720) and routes bandwidth estimation probing packets with the selected flow signature through the routing path that corresponds to the selected flow signature. In some embodiments, the bandwidth estimation probing packets are generated with the selected flow signature by encapsulating the forwarding address of the flow signature in the probing packets' headers. In this manner, the probing packets will be forwarded through the same identified path towards the destination endpoint that corresponds with the selected flow signature. In some embodiments, the bandwidth estimation probing packets are generated with the flow signature by different bandwidth estimation tools such as pathchar, clink, pchar, etc.

Next, the process 700 calculates (at 730) the estimated bandwidth for each link that is along the selected routing path. In some embodiments, the process tries to infer the bandwidth (and/or latency) of individual links along the path by measuring the round trip time of probing packets sent from the source node. The process of some embodiments takes advantage of the TTL field in the probing packet. As described above, the value set in the TTL field determines how many links a packet can traverse before it expires. If a forwarding element receives a probing packet that has expired, it drops the packet and sends an ICMP error packet back to the sender. The source address of the error packet indicates which forwarding element (e.g., router) the outgoing packet reached before expiring. The process of some embodiments sends out a series of probing packets with varying values of TTL field and varying packet sizes. For each probing packet, the process measures the time until the error packet is received. By performing statistical analysis of these measurements, the process of some embodiments infers the bandwidth (and/or latency) of each link on the path.

Figure 8:
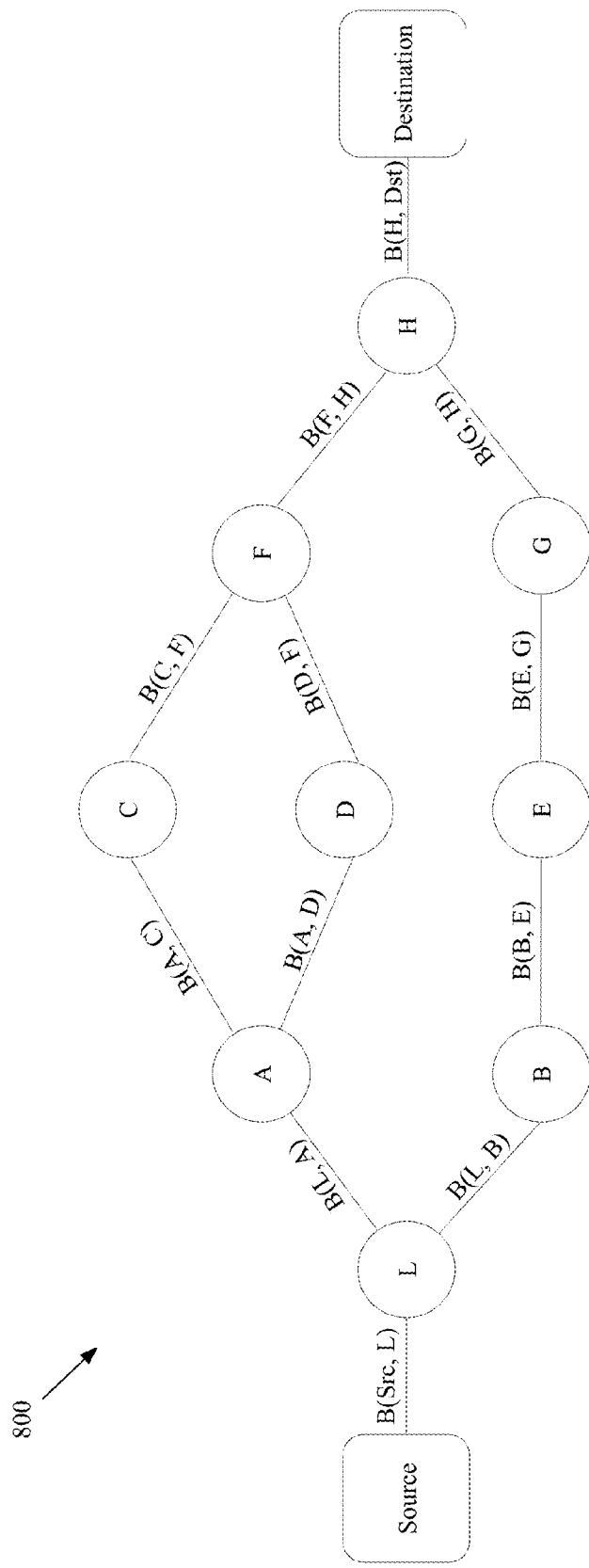
FIG. 8 illustrates an example of how the process of some embodiments calculates an estimated bandwidth for each link along different paths.

FIG. 8 illustrates a network topology 800 which is similar to the network topology that was described by reference to FIGS. 5A-5C and FIG. 6. FIG. 8 shows that the bandwidth estimation method has identified the estimated bandwidths of the links along the three identified routing paths between the source node and the destination node (e.g., through the method that is described above). The first identified path in the figure as described by reference to FIG. 6 corresponds to flow signature 21 and includes the nodes Src, L, A, C, F, H, and Dst. The method has sent bandwidth estimation probing packets generated by an estimation tool to estimate the bandwidth of all the links on this path. These bandwidth estimations are illustrated as B(Src, L) which is the bandwidth estimation for the link between the source node and node L, B(L, A) which is the bandwidth estimation for the link between node L and node A, B(A, C) which is the bandwidth estimation for the link between node A and node C, B(C, F) which is the bandwidth estimation for the link between node C and node F, B(F, H) which is the bandwidth estimation for the link between node F and node H, and finally B(H, Dst) which is the bandwidth estimation for the link between node H and the destination node.

The process 700 then determines (at 740) whether there are more flow signatures to select. If the process 700 determines that the probed flow signature was the last flow signature and there are no more flow signatures to select, the process ends. On the other hand, if the process 700 determines that more flow signatures are left to probe, the process selects the next flow signature and returns to 720 which was described above.

FIG. 8 shows that the bandwidth estimation method has selected the second flow signature 23 corresponding to the identified path that includes the nodes Src, L, A, D, F, H, and Dst. The method has sent probing packets with an estimation tool to estimate the bandwidth of all the links on this path. These bandwidth estimations are illustrated as B(Src, L) which is the bandwidth estimation for the link between the source node and node L, B(L, A) which is the bandwidth estimation for the link between node L and node A, B(A, D) which is the bandwidth estimation for the link between node A and node D, B(D, F) which is the bandwidth estimation for the link between node D and node F, B(F, H) which is the bandwidth estimation for the link between node F and node H, and finally B(H, Dst) which is the bandwidth estimation for the link between node H and the destination node.

Lastly, FIG. 8 also shows that the method has selected the third and last flow signature 22 corresponding to the identified path that includes the nodes Src, L, B, E, G, H, and Dst. The method has sent probing packets with an estimation tool to estimate the bandwidth of all the links on this path. These bandwidth estimations are illustrated as B(Src, L) which is the bandwidth estimation for the link between the source node and node L, B(L, B) which is the bandwidth estimation for the link between node L and node B, B(B, E) which is the bandwidth estimation for the link between node B and node E, B(E, G) which is the bandwidth estimation for the link between node E and node G, B(G, H) which is the bandwidth estimation for the link between node G and node H, and finally B(H, Dst) which is the bandwidth estimation for the link between node H and the destination node.

In some embodiments, the process calculates the bandwidth capacity of each link and path when it calculates the estimated bandwidth for the links and paths. In some embodiments, the process calculates the available minimum bandwidth of the network traffic (hop-by-hop links and end-to-end path). In some embodiments, the process calculates both capacity and available bandwidth when it estimates the bandwidth of each link and path in the network topology.

Some embodiments perform variations on the process 700. The specific operations of the process 700 may not be performed in the exact order shown and described. The specific operations may not be performed in one continuous series of operations, and different specific operations may be performed in different embodiments.

As described above, after calculating an estimated bandwidth for each link that is between the pair of endpoints, the method of some embodiments aggregates all of the calculated estimated bandwidths of the links in order to estimate the bandwidth between the two endpoints. In order to aggregate, the method of some embodiments normalizes the estimated bandwidths of the diverged links first and then calculates a minimum bandwidth of the normalized links and the non-diverged links between the endpoints to complete the aggregation.

In order to normalize, the method of some embodiments first identifies the diverged nodes. The method then recursively calculates an estimated bandwidth for a hypothetical link between each pair of diverged nodes. After calculating the bandwidths for all the diverged nodes, the method of some embodiments calculates a minimum of estimated bandwidths of all the hypothetical links and estimated bandwidths of all other non-diverged links that lie between the endpoints in order to estimate the bandwidth between the two endpoints.

Figure 9:
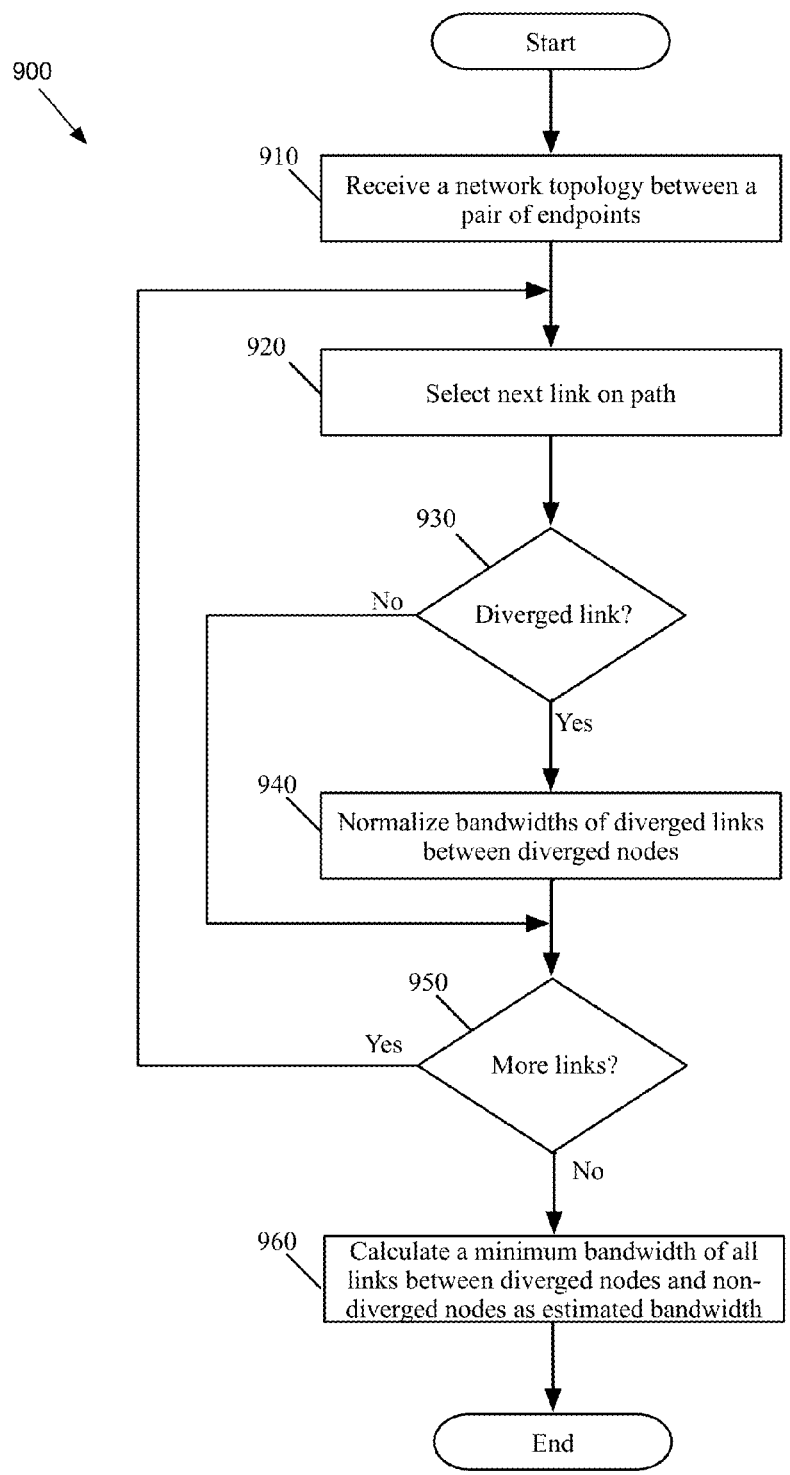
FIG. 9 conceptually illustrates a process of some embodiments that aggregates the calculated bandwidths of all the links between the pair of endpoints to generate an estimated bandwidth between the endpoints.

FIG. 9 conceptually illustrates a process 900 of some embodiments that aggregates the calculated bandwidths of all the links between the pair of endpoints to generate an estimated bandwidth between the endpoints. FIG. 9 will be described by reference to FIG. 10 which illustrates an example of how the process 900 aggregates the estimated bandwidths of the links by (1) normalizing the bandwidths between each pair of diverged nodes and (2) calculating a minimum bandwidth of the links between diverged nodes and non-diverged nodes.

The process 900 begins by receiving (at 910) a network topology between a pair of endpoints. The network topology, as described above, is generated in some embodiments by a network measurement service running on a network manager. The network measurement service of some embodiments facilitates in generating a topology between a pair of endpoints (e.g., a pair of transport nodes) by communicating with a pair of network measurement agents that operate on the pair of endpoints and cause the endpoints forward probing packets to each other (e.g., a full mesh probing that was discussed in Section I).

Figure 10:
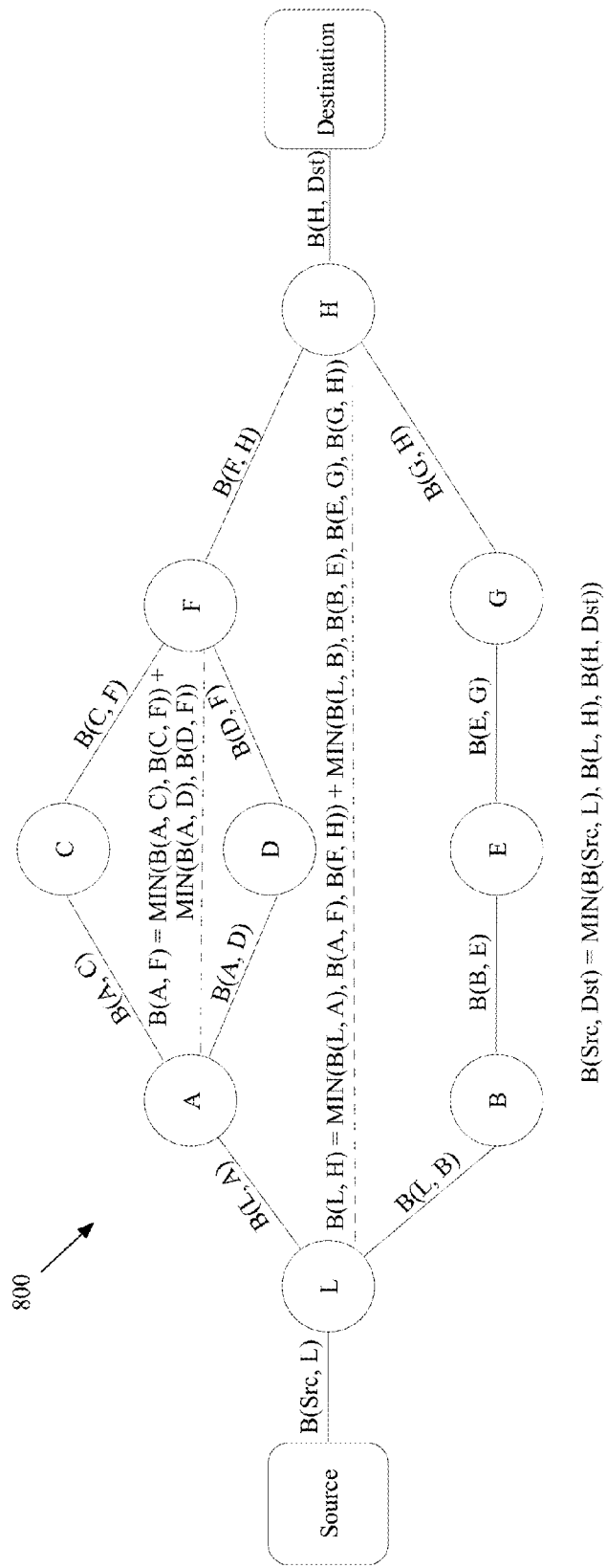
FIG. 10 illustrates an example of how the process aggregates the estimated bandwidths of the links.

Next, the process 900 selects (at 920) the first link on the path between the source node and the destination node. FIG. 10 shows the same network topology 800 that is illustrated in FIG. 8. The first link between the source node and the destination node in this network topology is the link between the source node and node L, therefore the process selects this node.

The process 900 then determines (at 930) whether the selected link is a diverged link in a set of diverged links. As described above, diverged links are the links that share the same starting and ending nodes (diverged nodes). If the selected link is not a diverged link in a set of diverged links, the process proceeds to 950, which will be described later below. As shown in FIG. 10, the first selected link, which is the link between the source node and node L, does not share these nodes with any other link and therefore this link is not a diverged link.

On the other hand, if the process 900 determines (at 930) that the selected link is a diverged link (i.e., a link that shares the forwarding node with at least one other link in the network topology), the process normalizes the bandwidths of all the diverged links between each pair of diverged nodes that are situated on either side of the diverged links. In order to normalize, the process of some embodiments first identifies each pair of diverged nodes. Each set of diverged links includes two or more successive links on a particular path that connects the pair of diverged nodes.

The method then recursively calculates an estimated bandwidth for a hypothetical link between each pair of diverged nodes. That is, when there are nested pairs of diverged nodes inside other pairs of diverged nodes, the process starts with the most inner pair of diverged nodes and continues the calculations recursively outward. The estimated bandwidth for each hypothetical link is calculated by (1) identifying a minimum of all estimated bandwidths of all diverged links in each set of diverged links on a particular path and (2) summing up the identified minimum bandwidths.

After the normalization, the process 900 determines (at 950) whether there are more links to process. If there are more links, the process returns to 920 to select the next link and to decide whether to normalize that link too or not. If the process determines (at 950) that no more links left, the process will proceed to 960, which will be described below.

Returning to FIG. 10, as explained above, the first link is not a diverged link, therefore the process selects the next link on the path without performing a normalization. The next link (i.e., the link between node L and node A) however, is a diverged link because it shares the forwarding node L with another link (i.e., link LB). Therefore, and as described above, the process recursively normalizes the diverged links starting from the most inner pair of diverged nodes. In the illustrated network topology, the most inner pair of diverged nodes is the pair of nodes A and F. Therefore, the process starts by normalizing the diverged links between diverged nodes A and F.

In order to normalize the diverged links and calculate an estimated bandwidth between the diverged nodes (e.g., bandwidth estimation for the hypothetical link AF), the process of some embodiments first identifies a minimum of all estimated bandwidths of all diverged links in each set of diverged links on a particular path between the diverged nodes. As shown in FIG. 10 the diverged links in the first set of diverged links between nodes A and F are the links AC and CF that are along the first path and the diverged links in the second set of diverged links are the links AD and DF that are along the second path (e.g., the first and second paths identified by the method as described above by reference to FIG. 6).

After calculating the minimum bandwidths for each set of diverged links, the process adds up the minimum bandwidth of each set together to generate the estimated bandwidth for the hypothetical link AF. Therefore, in FIG. 10, the estimated bandwidth between the diverged nodes A and F (i.e., B(A, F)) will be the minimum bandwidth of the diverged links LC and CF (i.e., MIN(B(L, C), B(C, F))) plus the minimum bandwidth of the diverged links AD and DF (i.e., MIN(B(A, D), B(D, F))) as shown in the figure.

The process 900 after calculating the bandwidth between the diverged nodes A and F will then start calculating the bandwidth between the outer diverged nodes L and H by normalizing the diverged links between these nodes. That is, the process first identifies the different sets of diverged links between the two nodes and then adds up the minimum of each identified set to the other sets. Therefore, the estimated bandwidth between the nodes L and H (for the hypothetical link LH) will be determined by calculating a minimum of the bandwidths of the first set of diverged links which includes the links LA, AF, and FH and the second set of diverged links which includes the links LB, BE, EG, and GH; and then adding the two minimum variables. The estimated bandwidth for link LH will therefore be MIN(B(L, A), B(A, F), B(F, H)) plus MIN(B(L, B), B(B, E), B(E, G), B(G, H)).

After the normalization of these diverged links, the process determines that one more link is left between the pair of endpoints, which is the link between node H and the destination endpoint. Since this link is not a diverged link the process does not perform the normalization process. Also since this link is the last link in the network topology, the process proceeds to 960. At 960, the process calculates a minimum bandwidth of all links between the diverged nodes and non-diverged nodes as the estimated bandwidth between the pair of endpoints. The process then ends.

In FIG. 10, the process has determined that the link between the source node and node L and the link between node H and the destination node are not diverged links. The process has also calculated an estimated bandwidth for all the diverged links between node L and node H as described above. Therefore, the process can now calculate an estimated bandwidth between the pair of endpoints by calculating a minimum of these estimated bandwidths. Therefore, the estimated bandwidth between the pair of endpoints will be MIN(B(Src, L), B(L, H), B(H, Dst)).

Some embodiments perform variations on the process 900. The specific operations of the process 900 may not be performed in the exact order shown and described. For example, in some embodiments, the process starts by selecting the nodes instead of the links. That is, the process after selecting each node, determines whether the node is a diverged node and then performs the normalization based on that determination. The specific operations may not be performed in one continuous series of operations, and different specific operations may be performed in different embodiments.

III. Periodical Probing

In some embodiments, the method generates different network measurements data (e.g., network topology, bandwidth estimation of different paths, etc.) for a pair of endpoints upon receiving a network administrative request (e.g., an application programming interface (API) request) or by other means (e.g., automatically and without intervention of a user). In some embodiments, the method is implemented by a network measurement agent operating on each endpoint and a centralized service component (e.g., web service layer) executing on a network manager machine (e.g., a controller) that responds to measurement requests. The network measurement agent of some embodiments probes the network periodically (i.e., in certain time intervals) or upon an API request that it receives through the network manager machine to gather the measurement data of a particular network topology between a pair of endpoints (e.g., the pair of endpoints on which the network measurement agents operate).

In some embodiments, when a network measurement feature is turned "on" or enabled (e.g., through an API), the network measurement agent can provide (e.g., to a network measurement server or the network manager machine) real-time data (e.g., bandwidth capacity, available bandwidth, etc.) or the most recent measurement data on each possible path (e.g., a link, multiple links, etc.) between a given pair of internet protocol (IP) endpoints. The endpoints of some embodiments are transport nodes that belong to different hosts of the network. Each host of the network in some embodiments is a computing machine that hosts several virtual machines (VMs). Each VM of a host communicates with other VMs of the same host or other hosts in the network through the transport nodes (e.g., hardware or software-defined EFEs) of host(s).

For instance, with an API request via a network measurement interface of a network manager machine, the network measurement agent of some embodiments can periodically measure the bandwidths between a pair of endpoints of the network. This is important because the data (e.g., real-time data) can be used in a number of different ways, including forwarding traffic along different paths. For instance, the always "on" feature can be used to retrieve real-time measurement data and assign different flow signatures or hashes for different data flows depending on the measurement data. With the hop-by-hop measurements and the different flow signatures associated with a given topology, the flow of data, from a source to a destination, can even be controlled on a per hop basis. The network measurement server of some embodiments stores the provided network measurement data in a storage (e.g., a database). Rather than simply storing the measurement data, the server of some embodiments accumulates or aggregates the measurement data. That is, for a pair of endpoints, the server stores the measurement data and then updates the data with each updated measurement data it receives from the measurement agents.

While the embodiments described above and below provide a network measurement agent for estimating bandwidth for a pair of endpoints or generating network topology between the endpoints, many embodiments of the invention are equally applicable to a combination of a network measurement interface, as described above, and a set of one more network measurement agents that operate on different transport nodes. In other words, the operations described above and below that are done by a network measurement agent are equally achievable, in some embodiments, by a network measurement interface that runs on a network manager machine (e.g., a controller) and its corresponding set of network measurement agents that operate on different transport nodes.

Figure 11:
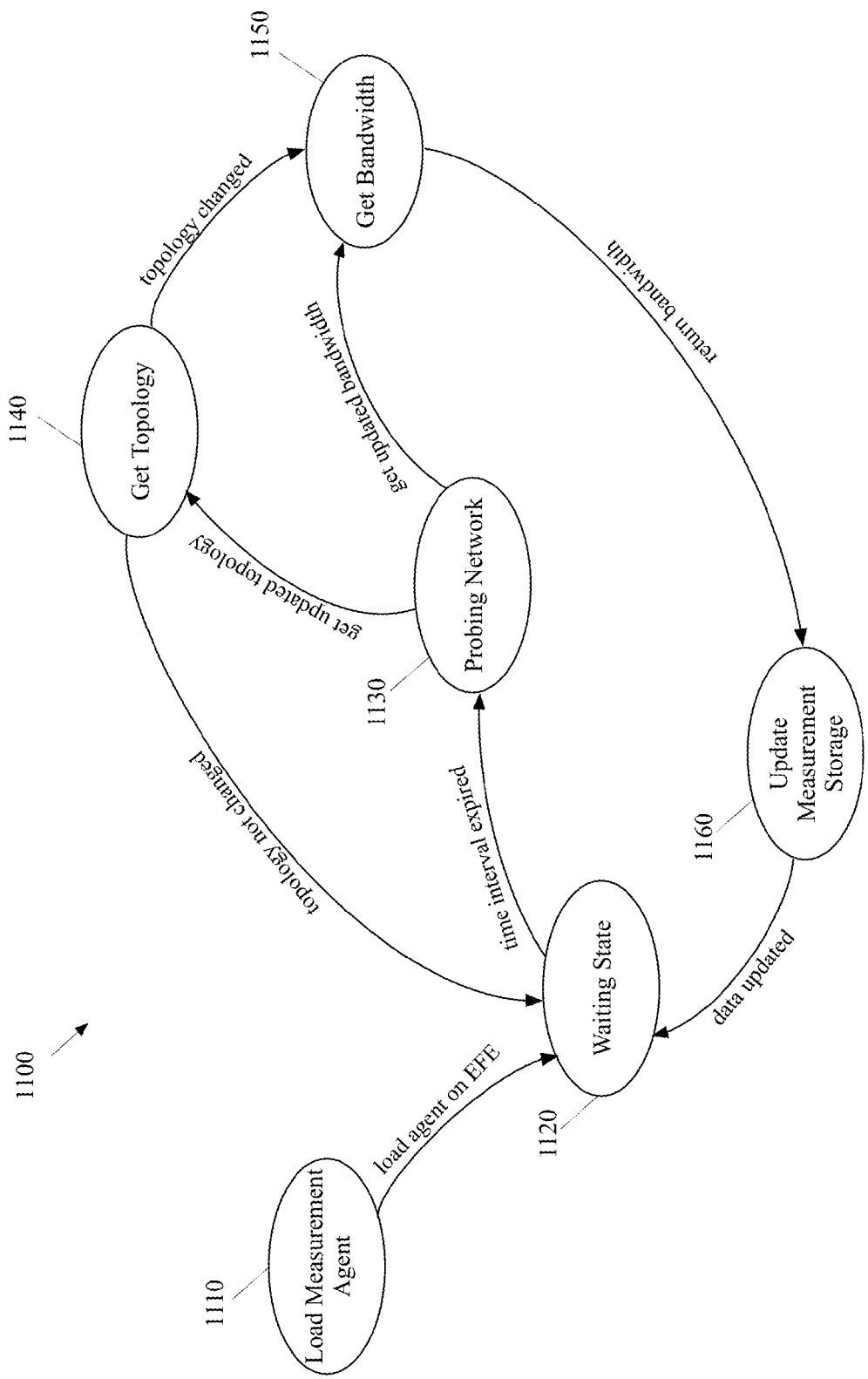
FIG. 11 presents a state diagram that illustrates example operations performed by such a network measurement agent.

FIG. 11 presents a state diagram 1100 that illustrates example operations performed by such a network measurement agent. This figure shows several states 1110-1160 that collectively perform these operations. Each of the states represents a set of one or more processes for performing a subset of the operations. The states include a loading state 1110, a waiting state 1120, a probing network state 1130, a get topology state 1140, a get bandwidth state 1150, and an update measurement storage state 1160. Not all operations have to be performed by the network measurement agent. For instance, the network measurement agent of some embodiments does not update the measurement data in the measurement storage and instead, the service component or another module performs the storage updating operation. Also not all transitions between the operations are automatic. For instance, as stated above, a network measurement agent might probe the network upon a user request (e.g., API request) and not necessarily after a time interval is expired.

In the load measurement state 1110, the network measurement agent is uploaded on the forwarding element. In some embodiments, the measurement agent is a software agent that is uploaded onto the edge forwarding element of a host machine of a datacenter each time the edge forwarding element is instantiated in the network (e.g., each time the host machine is connected to the network for the first time). In some embodiments the measurement agent is uploaded on a hypervisor of the host machine. In some embodiments the measurement agent is uploaded on a virtual network interface card of a source VM or a destination VM that runs on a host machine.

In the waiting state 1120, the network measurement agent of some embodiments waits for a certain time interval to expire in order to start probing a network (e.g., the network topology between two endpoints). Therefore, the network measurement agent periodically (i.e., when the time interval has expired) and without any user (e.g., network administrator) intervention transitions to the probing network state 1130. In the probing network state, the network measurement agent starts probing the network by first determining whether the network topology has changed or not. The measurement agent transitions to the get topology state to make such determination.

As stated before, the network topology includes a set of physical forwarding element (hardware or software-defined forwarding elements) as well as a set of logical forwarding elements. The set of physical forwarding elements of some embodiments can be changed in a network (e.g., a software-defined datacenter network) rapidly as forwarding elements (hardware or software-defined) can be added to, removed from, or transferred to a different host machine of the network or a host machine of a different network (e.g., another software-defined datacenter network). These changes would result in changes of network topology between two endpoints.

In the get topology state, the network measurement agent of some embodiments identifies a network topology that is involved in routing of the network traffic between the edge forwarding element on which the network agent runs and another edge forwarding element to which the network traffic is routed. The network measurement agent of some embodiments identifies the network topology using the enhanced traceroute method that was described above in Section I and by reference to FIGS. 3 and 4. If the network measurement agent determines that there is no change in the network topology, in some embodiments, the agent transitions back to the waiting state 1120.

However, in some embodiments, even when there is no change in the network topology, the network measurement agent transitions from probing network state 1130 to get bandwidth state 1150 in order to calculate the available minimum bandwidth of the network traffic (hop-by-hop links and end-to-end path) in spite of no change in the estimated capacity of the network. When there is a change in the network topology, the network measurement agent of some embodiments transitions to get bandwidth state.

In the get bandwidth state 1160, the network measurement agent calculates the estimated bandwidths (e.g., available bandwidth and bandwidth capacity) of all the existing links and paths in the network topology. That is, the agent calculates the bandwidths of the links and paths between the edge forwarding element on which the network agent runs and another edge forwarding element to which the network traffic is routed. Several examples of calculating the estimated bandwidth have been described above in Section II by reference to FIGS. 5-10. After calculating the bandwidth estimation, the measurement agent transitions to the update measurement storage state 1160.

In the update measurement storage state 1160, the network measurement agent of some embodiments stores the network measurement data in a storage (e.g., a database) so later the forwarding element can retrieve these data and make decision regarding which path the network traffic should be routed. Rather than simply storing the measurement data, the edge forwarding element of some embodiments accumulates or aggregates the measurement data. That is, for a pair of endpoints, the forwarding element stores the measurement data and then updates the data with each updated measurement data it receives from the measurement agent.

As described before, by knowing the estimated bandwidth for different paths, a controller that interacts with a pair of forwarding elements of a network can decide which path to use for packets that are associated with different data flows (e.g., elephant flows, mouse flows, etc.). For example in some embodiments, the network manager can decide to route a data flow from a first endpoint device to a second endpoint device through a particular routing path when an estimated bandwidth of the particular routing path is more than a threshold amount or less than a threshold amount.

In this manner, one set of packets belonging to a particular data flow is not held behind a routing path that is used by another set of packets belonging to another data flow for a prolonged period of time. Alternatively, or conjunctively, the forwarding element can decide to switch the transportation of a particular data flow from one path to another path based on the capacity and available bandwidth of each path. In some embodiments, an edge forwarding element breaks an elephant flow to multiple mice flows and route each mouse flow to a different routing path based on the capacity and available bandwidth that it receives from its corresponding network measurement agent. The forwarding elements of some embodiments make such decisions through one or more controllers (e.g., hardware of software-defined controllers) that control the forwarding elements.

Figure 12:
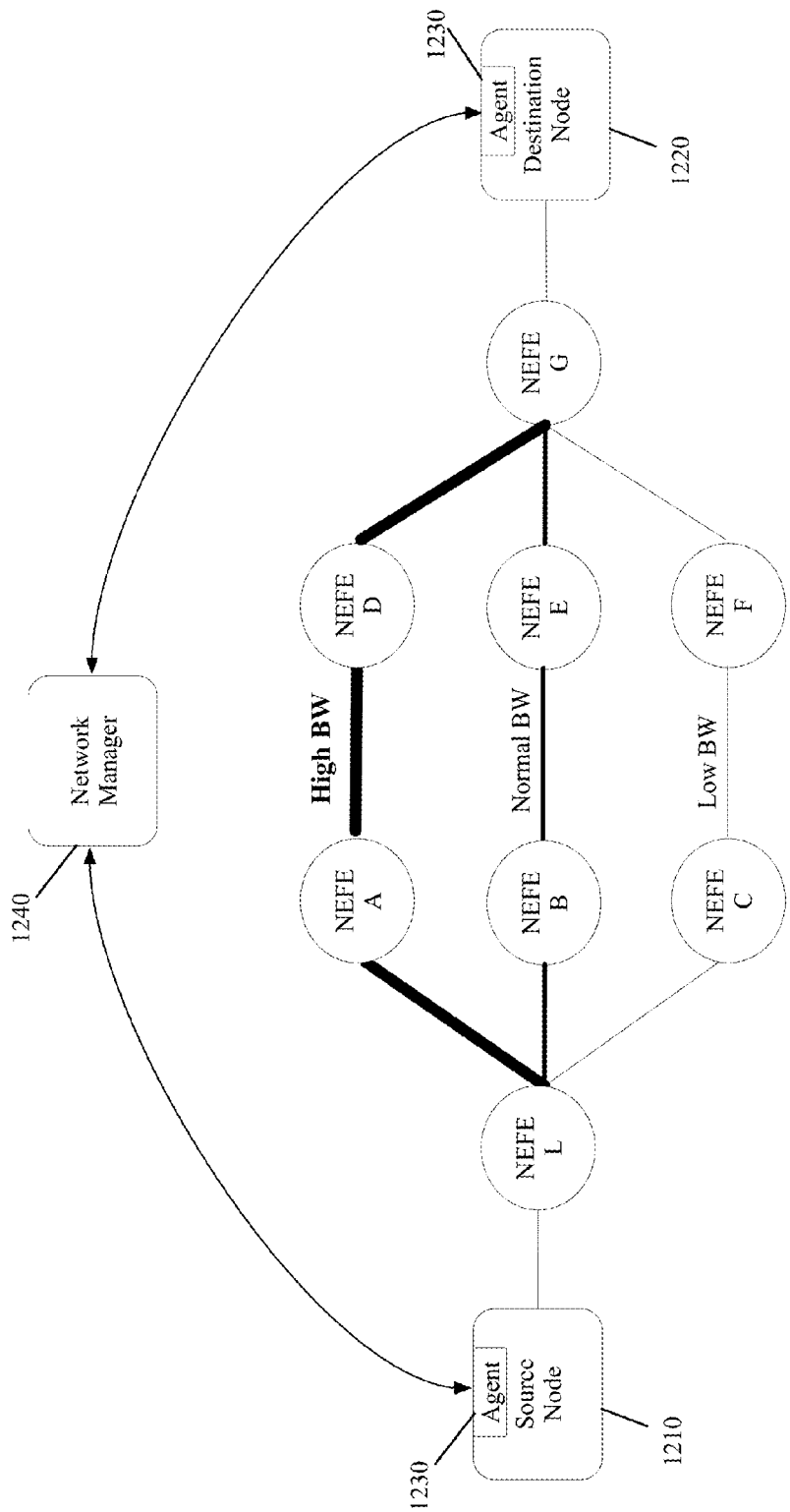
FIG. 12 illustrates an example of how the method of some embodiments routes different sets of packets that belong to different data flows through different paths between two endpoints based on the estimated bandwidth of each path.

FIG. 12 illustrates an example of how the method of some embodiments routes different sets of packets that belong to different data flows through different paths between two endpoints based on the estimated bandwidth of each path. More specifically FIG. 12 shows a source node 1210 and a destination node 1220 and several intermediate nodes (e.g., NEFEs) along three different paths between the pair of endpoints. This figure also shows a network manager 1240 (e.g., a controller) which in some embodiments is used to manage and configure the endpoints 1210 and 1220. The network manager 1240 of some embodiments includes a measurement interface (not shown) that communicates with the network measurement agents 1230 that operate on the transport nodes (i.e., end points) 1210 and 1220.

The network manager 1240 in some embodiments perform additional management services by sending (e.g., pushing) management data (e.g., bridge information, virtual interface information, tunnel information, etc.) to the physical forwarding elements (e.g., transport nodes). The network manager of some embodiments performs the configuration by sending (e.g., pushing) data flows to the transport nodes. Instead of sending the data flows, the network manager 1240 of some embodiments exchanges forwarding state information that is translated into a set of data flows at the transport nodes.

FIG. 12 shows that the network manager 1240 and its corresponding network measurement agents 1230 have already recognized the network topology between the pair of endpoints 1210 and 1220. The figure also shows that these measurement tools have identified three different paths between the pair of endpoints with three different bandwidths. More specifically, the path LADG has a higher bandwidth than the path LBEG whereas the path LBEG has a higher bandwidth that the path LCFG. The difference in the bandwidth in the figure is shown by different thickness for each path.

By recognizing the different paths and the different bandwidths for each path, the method of some embodiments can handle packets that belong to different data flows differently. For example, in some embodiments a transport node at the edge of the network (i.e., an endpoint) or its corresponding controller monitors statistics or measurements relating to a data flow. As an example, the transport node may track the number of bytes sent in the data flow, and specify, based on the number of bytes, whether the data flow should be classified as an elephant flow or a mouse flow.

Once an elephant flow is detected, the transport node of some embodiments treats it differently than a mouse flow. For example the network manager 1240 of some embodiments forwards the packets that are associated with the elephant flow through a path with a lower bandwidth (e.g., path LCFG) between the endpoints. This is because an elephant flow typically represents a long-lived data flow that is associated with high volume connection and therefore tends to fill network paths which in turn introduces nontrivial queuing delay to any other data flow that shares the paths.

Different from an elephant flow, a mouse flow represents a short-lived flow. Mice are often associated with bursty, latency-sensitive applications, whereas elephants tend to be associated with large data transfers in which throughput is far more important than latency. Therefore, the network manager 1240 of some embodiments forwards the packets that are associated with the mouse flow through a path with a higher bandwidth (e.g., path LADG) between the endpoints. In this manner, the set of packets belonging to the mouse flow is not held behind the path that is used by the set of packets that belong to the mouse flow for a prolonged period of time. Some embodiments that detect and handle elephant flows are described in U.S. patent application Ser. No. 14/231,647, now published as U.S. Patent Publication 2015/0163144, entitled "Detecting and Handling Elephant Flows," filed Mar. 31, 2014, which is incorporated herein by reference.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 13:
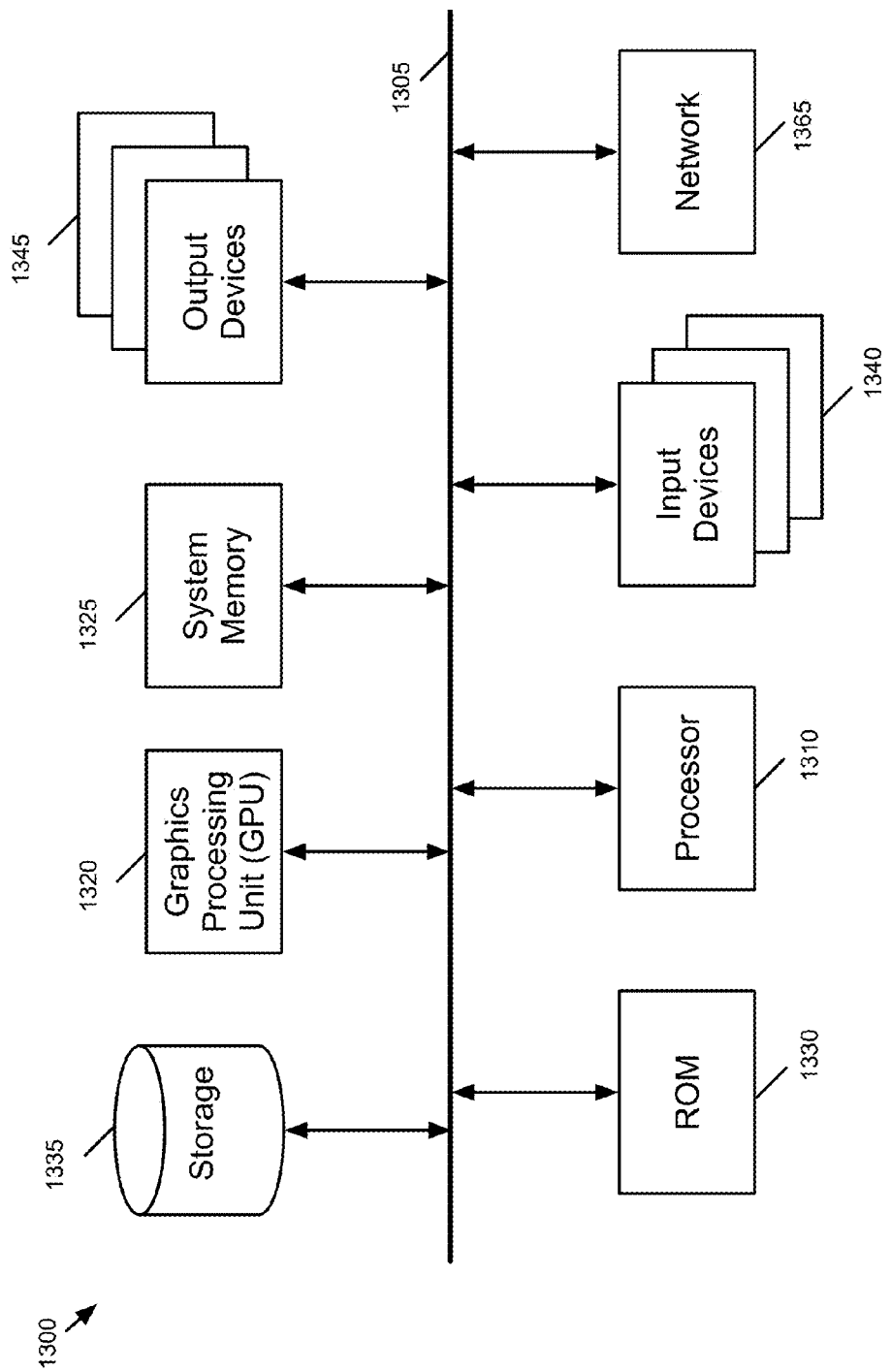
FIG. 13 conceptually illustrates an electronic system with which some embodiments of the invention are implemented.

FIG. 13 conceptually illustrates an electronic system 1300 with which some embodiments of the invention are implemented. The electronic system 1300 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1300 includes a bus 1305, processing unit(s) 1310, a system memory 1325, a read-only memory 1330, a permanent storage device 1335, input devices 1340, and output devices 1345.

The bus 1305 collectively represents all system, peripheral, and chipset buses that communicatively connect the numerous internal devices of the electronic system 1300. For instance, the bus 1305 communicatively connects the processing unit(s) 1310 with the read-only memory 1330, the system memory 1325, and the permanent storage device 1335.

From these various memory units, the processing unit(s) 1310 retrieves instructions to execute and data to process in order to execute the processes of the invention. The processing unit(s) may be a single processor or a multi-core processor in different embodiments.

The read-only-memory (ROM) 1330 stores static data and instructions that are needed by the processing unit(s) 1310 and other modules of the electronic system. The permanent storage device 1335, on the other hand, is a read-and-write memory device. This device is a non-volatile memory unit that stores instructions and data even when the electronic system 1300 is off. Some embodiments of the invention use a mass-storage device (such as a magnetic or optical disk and its corresponding disk drive) as the permanent storage device 1335.

Other embodiments use a removable storage device (such as a floppy disk, flash memory device, etc., and its corresponding drive) as the permanent storage device. Like the permanent storage device 1335, the system memory 1325 is a read-and-write memory device. However, unlike storage device 1335, the system memory 1325 is a volatile read-and-write memory, such a random access memory. The system memory 1325 stores some of the instructions and data that the processor needs at runtime. In some embodiments, the invention's processes are stored in the system memory 1325, the permanent storage device 1335, and/or the read-only memory 1330. From these various memory units, the processing unit(s) 1310 retrieves instructions to execute and data to process in order to execute the processes of some embodiments.

The bus 1305 also connects to the input and output devices 1340 and 1345. The input devices 1340 enable the user to communicate information and select commands to the electronic system. The input devices 1340 include alphanumeric keyboards and pointing devices (also called "cursor control devices"), cameras (e.g., webcams), microphones or similar devices for receiving voice commands, etc. The output devices 1345 display images generated by the electronic system or otherwise output data. The output devices 1345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 13, bus 1305 also couples electronic system 1300 to a network 1365 through a network adapter (not shown). In this manner, the computer can be a part of a network of computers (such as a local area network ("LAN"), a wide area network ("WAN"), or an Intranet, or a network of networks, such as the Internet. Any or all components of electronic system 1300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 3, 7, and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A network comprising:
a first network host executing a first forwarding element and a first set of machines, the first forwarding element for communicating with a second forwarding element executing on a second network host that hosts a second set of machines, wherein the first forwarding element implements a probing agent that when enabled:
periodically probes a plurality of routing paths between the first and second forwarding elements;
generates a set of network measurements data comprising an estimated bandwidth for each routing path, said estimated bandwidth calculated by identifying a flow signature for the routing path and generating a set of probing packets with the identified flow signature to calculate an estimated bandwidth for each link on the routing path; and
a network manager for receiving the set of network measurements data and controlling flow of data between a machine executing on the first network host and a second machine executing on the second network host based on the set of measurements data.

2. The network of claim 1, wherein each of the first and second forwarding elements comprises a software-defined forwarding element that executes in a hypervisor of the host machine.

3. The network of claim 1, wherein the set of network measurements data further comprises a network topology between the first and second network hosts.

4. The network of claim 1, wherein the estimated bandwidth of each path is an estimated available bandwidth of the path.

5. The network of claim 1, wherein the estimated bandwidth of each path is an estimated capacity of the path.

6. The network of claim 1, wherein the network manager causes the first forwarding element to forward a data flow to the second forwarding element through a particular routing path when an estimated bandwidth of the particular routing path is more than a threshold bandwidth.

7. The network of claim 6, wherein the particular routing path is a first routing path, wherein the network manager causes the first forwarding element to forward the data flow to the second forwarding element through a second routing path when the estimated bandwidth of the first routing path is less than the threshold bandwidth.

8. The network of claim 7, wherein the second routing path has an estimated bandwidth that is more than the threshold bandwidth.

9. A non-transitory machine readable medium of a first host machine storing a program which when executed by at least one processing unit generates a set of network measurements data between a first forwarding element of the first host machine and a second forwarding element of a second host machine, the program comprising sets of instructions for:
periodically probing a plurality of routing paths between the first and second forwarding elements;
generating a set of network measurements data comprising an estimated bandwidth for each routing path, said estimated bandwidth calculated by identifying a flow signature for the routing path and generating a set of probing packets with the identified flow signature to calculate an estimated bandwidth for each link on the routing path; and
reporting the generated set of network measurements data to a machine that controls a flow of data between the first and second forwarding elements.

10. The non-transitory machine readable medium of claim 9, wherein the first and second forwarding elements are internet protocol (IP) transport nodes executing on the first and second host machines, respectively.

11. The non-transitory machine readable medium of claim 9, wherein the first host machine hosts a first set of virtual machines (VMs) while the second host machine hosts a second set of VMs, wherein the data flow is from a source VM in the first set of VMs to a destination VM in the second set of VMs.

12. The non-transitory machine readable medium of claim 9, wherein the first and second hosts are among a plurality of hosts in a datacenter network.

13. The non-transitory machine readable medium of claim 12, wherein the datacenter is a software-defined datacenter.

14. The non-transitory machine readable medium of claim 11, wherein the flow of data is from a source VM in the first set of VMs to a destination VM in the second set of VMs.

15. The non-transitory machine readable medium of claim 9, wherein the set of network measurements data further comprises a network topology between the first and second forwarding elements.

16. The non-transitory machine readable medium of claim 9, wherein each of the first and second forwarding elements comprises an edge forwarding element, wherein at least one routing path in the plurality of routing paths comprises a set of non-edge forwarding elements along the routing path.

17. The non-transitory machine readable medium of claim 9, wherein the program further comprises a set of instructions for routing a data flow from the first forwarding element to the second forwarding element through a particular routing path when an estimated bandwidth of the particular routing path is more than a threshold bandwidth.

18. The non-transitory machine readable medium of claim 9, wherein the particular routing path is a first routing path, wherein the program further comprises a set of instructions for routing the data flow from the first forwarding element to the second forwarding element through a second routing path when the estimated bandwidth of the first routing path is less than the threshold bandwidth.

19. The non-transitory machine readable medium of claim 9, wherein the program further comprises a set of instructions for calculating an estimated bandwidth between the first and second forwarding elements by aggregating the calculated estimated bandwidths of the plurality of routing paths.

* * * * *